United States Patent [19]

Uya

[11] Patent Number: 5,500,684
[45] Date of Patent: Mar. 19, 1996

[54] CROMA-KEY LIVE-VIDEO COMPOSITING CIRCUIT

[75] Inventor: Masaru Uya, Osaka, Japan

[73] Assignee: Matsushita Electric Industrial Co., Ltd., Osaka, Japan

[21] Appl. No.: 354,877

[22] Filed: Dec. 9, 1994

[30] Foreign Application Priority Data

Dec. 10, 1993 [JP] Japan .................................. 5-310012

[51] Int. Cl.$^6$ ..................................................... H04N 5/275
[52] U.S. Cl. ........................... 348/592; 348/586; 348/587
[58] Field of Search .................................... 348/586, 587, 348/590, 591, 592; 358/22, 22 CK, 22 PIP, 22C; H04N 5/272, 5/275

[56] References Cited

FOREIGN PATENT DOCUMENTS 498647  8/1992  European Pat. Off. .

OTHER PUBLICATIONS

U.S. Ser. No. 08,091,250 dated Jul. 14, 1993 to Masaru Uya et al.

Primary Examiner—James J. Groody
Assistant Examiner—Sherrie Hsia
Attorney, Agent, or Firm—Willian Brinks Hofer Gilson & Lione

[57] ABSTRACT

A foreground live-video image, made up of a "blue back" part, a "hand/arm" part, and a "shadow" part of the "hand/arm" part, is chroma-key composited with a background live-video image. The "blue back" part is displayed to be transparent on the display screen. The "hand/arm" part is displayed to be opaque. The "shadow" part is displayed to be translucent. Whereas a first comparator determines a key color of the "blue back" part, a second comparator determines a key color of the "shadow" part. According to the output code of the first and second comparators, a data selector selects, pixel data of the background live-video image (Va) for the "blue back" part, pixel data of the foreground live-video image (Vb) for the "hand/arm" part, and pixel data found by multiplying each of the pixel data of Va and the pixel data of Vb by a respective weight and summing those products, as respective output pixel data. The "hand/arm" part may be displayed to be translucent by changing the output code relating to the "hand/arm" part by a code converter.

12 Claims, 22 Drawing Sheets

FIG.5A

| A1 A0 | Q1 Q0 |
|---|---|
| 0　0 | 0　0 |
| 0　1 | 0　1 |
| 1　0 | 1　0 |
| 1　1 | 1　1 |

| A1 A0 | Q1 Q0 |
|---|---|
| 0　0 | 1　1 |
| 0　1 | 0　1 |
| 1　0 | 1　0 |
| 1　1 | 1　1 |

| A1 A0 | Q1 Q0 |
|---|---|
| 0　0 | 0　0 |
| 0　1 | 0　1 |
| 1　0 | 1　0 |
| 1　1 | 0　1 |

| A1 A0 | Q3 Q2 Q1 Q0 |
|---|---|
| 0  0 | 1  1  0  0 |
| 0  1 | 1  1  0  1 |
| 1  0 | 0  1  1  0 |
| 1  1 | 1  1  0  1 |

| A1 A0 | Q2 Q1 Q0 |
|---|---|
| 0  0 | 1  0  0 |
| 0  1 | 1  0  1 |
| 1  0 | 0  1  0 |
| 1  1 | 1  0  1 |

(m2)(m1)

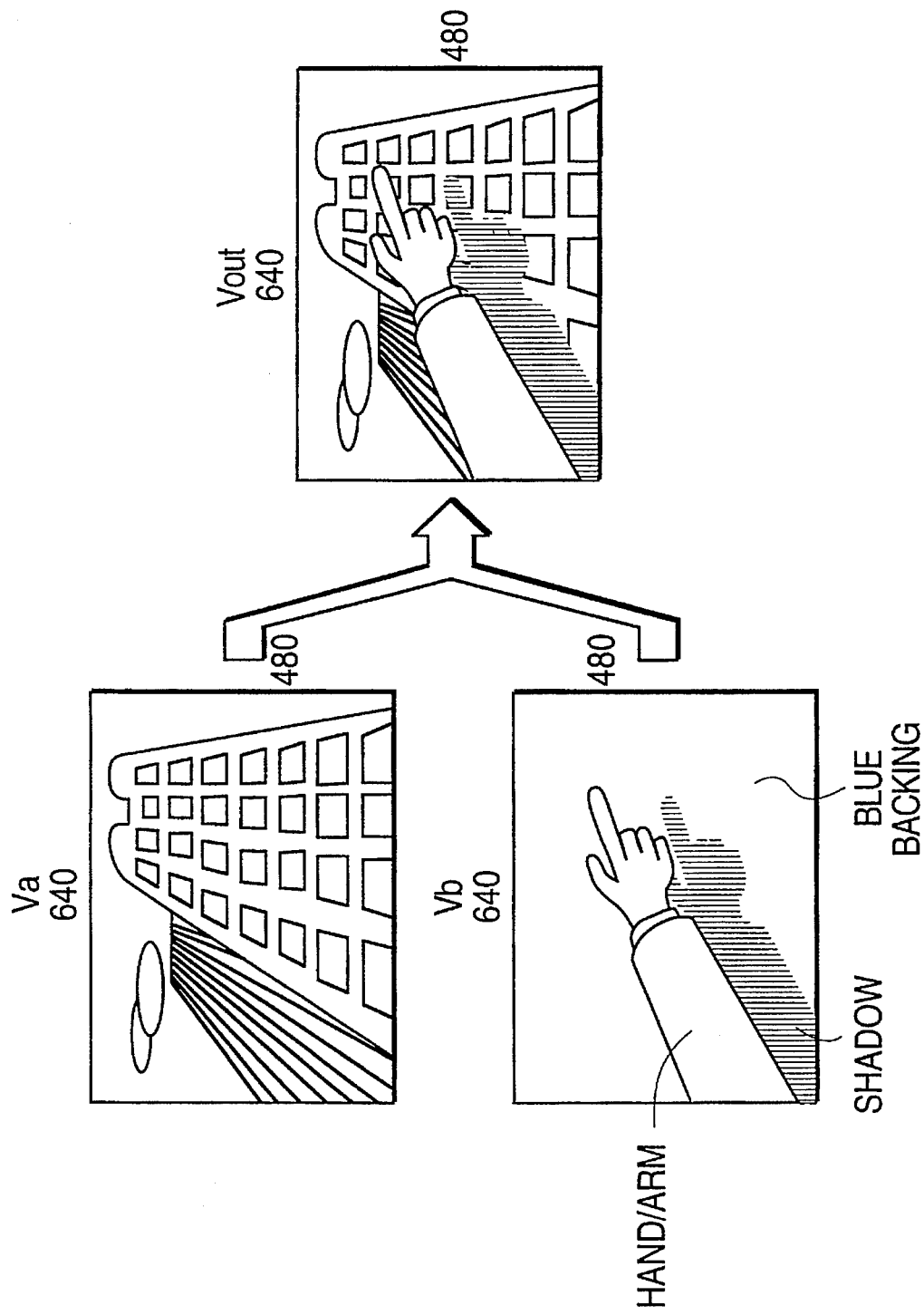

CROMA-KEY LIVE-VIDEO COMPOSITING CIRCUIT

BACKGROUND OF THE INVENTION

This invention pertains to a chroma-key live-video compositing circuit (CLCC) for combining one live-video image with a second live-video image to produce a mixed live-video image output in real time.

Exchange of video information between systems installed at different places has been regarded in recent years as a most important communication way to create a shared workspace between users. One such "face-to-face" communication system can be realized by installing at each place a multimedia computer that uses live-video images as a communication tool, and a video camera. The live-video images captured by the video cameras are exchanged and chroma-key composited. In other words, one live-video image captured by one video camera is mixed with a second live-video image captured by the other video camera. Such a communication technique is applicable in the field of presentation systems. For example, a live-video image of a hand of a person who is making presentation captured by a video camera is chroma-key composited with another live-video image played back from a device such as a VTR, thereby permitting the "hand" to point at any part of the reproduced live-video image.

FIG. 22 shows a conventional CLCC to be incorporated into a system with the above-described functions. The CLCC of FIG. 22 has the capability of combining a foreground live-video image (hereinafter called "Vb") with a background live-video image (hereinafter called "Va") to produce a mixed live-video image output (hereinafter called "Vout"). D-type flip-flops 901, 902, 903, 906 are shown in FIG. 22. The D-type flip-flops 901, 902, 903, 906 each hold and output their respective input data on the rising-edge of a clock signal (hereinafter called "CLK"). A condition-judging circuit 1 receives input data DataA and input data DataB. This condition-judging circuit 1 sends out a coincidence signal if DataA meets conditions described by DataB. In FIG. 22, the condition-judging circuit 1 is implemented by a comparator 21. The comparator 21, having two input terminals A and B and an output terminal Y, receives input data DataA at the input terminal A and input data DataB at the input terminal B and determines whether or not the value of DataA falls in a range defined by DataB. If the value of DataA is found to fall in such a range, then a coincidence signal of logical level "1" appears at the output terminal Y of the comparator 21, otherwise a signal of logical level "0" appears. A data selector 4, having two input terminals A and B, a selection signal input terminal S associated with the output terminal Y of the comparator 21, and an output terminal Y, receives an input signal A at the input terminal A, an input signal B at the input terminal B, and a selection signal S at the selection signal input terminal S. If the selection signal S (from the comparator 21)="0", then the input signal B is selected and appears at the output terminal Y of the data selector 4. On the other hand, if the selection signal S="1", then the input signal A is selected and appears at the output terminal Y of the data selector 4. In FIG. 22, "B(0)" means that S=0 results in causing the data selector 4 to select the input signal B, and "A(1)" means that S=1 results in causing the data selector 4 to select the input signal A. Dcon (i.e., the condition data) is fed to the comparator 21. The live-video image data Vb contains therein three primary color components (hereinafter called "RGB", R standing for red, G for green, and B for blue), each color component being represented by 8 bits of information. Correspondingly, the condition data Dcon of 48 bits is employed to determine a range of the value of the live-video image value by giving the upper limit of each of RGB (8 bits×3) and the lower limit of each of RGB (8 bits×3).

In synchronism with the CLK, the D-type flip-flop 901 receives the Va of FIG. 23 (i.e., the live-video image data of the buildings) pixel by pixel. The video data Va is displayed on the screen made up of 640×480 pixels, and each pixel consists of 8 bits of R, 8 bits of G, and 8 bits of B (that is, one pixel is formed by 24 bits). These 640×480 pixels are scanned as follows. The scanning starts with the uppermost scanning line, horizontally sweeping from left to right. Upon having reached the end of the uppermost scanning line, the scanning then goes down to the next scanning line. This second uppermost scanning line is likewise swept from left to right. Then the next scanning line is swept. Such continues until the bottom scanning line has been scanned. Thereafter the scanning goes back to where it was started. The D-type flip-flop 902 likewise receives the Vb of FIG. 23 (i.e., the live-video image of the hand with a "blue back" background) pixel by pixel, in synchronism with the CLK. Pixel data at the same scan positions are synchronously input.

The condition data Dcon is set to a key color of the "blue back" of Vb of FIG. 23. The D-type flip-flop 901, on the one hand, holds and outputs each pixel data of Va in synchronism with CLK. The D-type flip-flop 902, on the other hand, holds and outputs each pixel data of Vb in synchronism with CLK. The condition-judging circuit 1 sends out a signal of logical level "1", only when it receives pixel data describing the "blue back" of Vb. As a result, the D-type flip-flop 906, which has latched the output of the data selector 4, provides Vout of FIG. 23. As shown in FIG. 23, this Vout is an image as a result of superimposing or chroma-key compositing the "hand/arm" and the "shadow" of the "hand/arm" (these two images are out of the key color of the "blue back") with the "building".

As seen from the Vout of FIG. 23, the "buildings" are partly obscured by the "hand/arm" and the "shadow". In other words, a considerably great amount of video information fails to be conveyed. This may lead to a critical misunderstanding.

SUMMARY OF THE INVENTION

Accordingly, with a view to providing solution to the above-described problems with the prior art technique, the present invention was made. It is an object of the present invention to provide an improved chroma-key live-video compositing circuit (CLCC), wherein one live-video image (e.g., a "hand/arm" as a pointing tool) is superimposed over a background live-video image (e.g., "buildings") in such a way that the "buildings" are not obscured by the "hand/arm" and the "shadow" thereof.

The present invention provides a first CLCC for combining a foreground live-video image as a pointing tool with a background live-video image. The first CLCC has the following: at least one mixing circuit for multiplying each of pixel data of the foreground live-video image and pixel of the background live-video image by a respective weight and summing those products, to produce a translucent composition effect; a plurality of condition-judging circuits each having the capability of sending out a coincidence signal if the pixel data of the foreground live-video image meets conditions described by the condition data (i.e., the key color); and a data selector for selectively providing either the background live-video image, the foreground live-video image or the output of the mixing circuit (i.e., the mixed live-video image output with a translucent effect) according to the combination of the coincidence signal outputs of the plural condition-judging circuits.

The present invention provides a second CLCC. The second CLCC has the following: a mixing circuit for multiplying each of pixel data of a background live-video image and pixel data of a foreground live-video image by a respective weight and summing those products, to produce a translucent composition effect according to transparency data; a plurality of condition-judging circuits each having the capability of sending out a coincidence signal if the pixel data of the foreground live-video image meets conditions described by condition data (i.e., the key color); and a data selector for providing to the mixing circuit either at least one item of variable transparency data, one item of fixed complete transparency data, or one item of fixed opacity data according to the combination of the coincidence signal outputs of the plural condition-judging circuits.

The present invention provides a third CLCC. The third CLCC has a monochromizing circuit in addition to the above-described components. Upon receipt of pixel data of the foreground live-video image carrying color information, the monochromizing circuit removes the color information from the input pixel data and provides resultant pixel data carrying only the luminance (gray) components, in order to convert a colored "shadow" inevitably occurring to the foreground live-video image into a colorless "shadow". The mixing circuit multiplies each of the output of the monochromizing circuit and the pixel data of the background live-video image by a respective weight and sums those products according to the combination of the coincidence signal outputs of the plural condition-judging circuits, in order to cast a more naturally-looking "shadow" onto the background live-video image.

The present invention provides a fourth CLCC employing a 2-stage-pipelined architecture. In the fourth CLCC, all the inputs of the mixing circuit are fixed when no translucent composition effects are required, to cut down the power consumption.

The aforesaid condition-judging circuits allow a part of the foreground live-video image (e.g., the "shadow" or both the "hand/arm" and the "shadow") to be translucency-composited over the background live-video image. This enables the "hand/arm" to point at any part of the background live-video image without obscuration. Additionally, by translucency-compositing the "hand/arm" and the "shadow" with the background image at different degrees of transparency, more effective pointing action or presentation can be made. Furthermore, by converting a colored "shadow" which is an inevitable result of use of the blue background into a colorless "shadow" and by translucency-compositing such a "colorless shadow" with the background live-video image, a mixed live-video image looking remarkably natural can be obtained.

The present invention employs a plurality of condition-judging circuits for determining a key color of each pixel data. As a result of such an arrangement, when pointing at a certain part of the background live-video image with the foreground live-video image, the background image can be pointed at by the foreground live-video image without being obscured by the foreground image because a part of the foreground live-video image is translucency-composited with the background live-video image. Additionally, as described above, the "hand/arm" image and the "shadow" image may be translucency-composited with the background live-video image at different degrees of transparency. Further, the foreground live-video image may partly be monochromized in order to cast a more naturally looking black and white "shadow", not contaminated by unrelated colors, onto the background live-video image. As a result, more natural pointing or more effective presentation can be made. Therefore the present invention finds applications in multimedia computers as well as in presentation systems using live-video images as a communication means.

BRIEF DESCRIPTION OF THE DRAWINGS

FIGS. 5A–5C are diagrams showing examples of the setting of conversion tables of the code converter of FIG. 4.

FIG. 14 is a diagram showing an example of the setting of a conversion table of the FIG. 13 code converter.

FIG. 17 is a diagram showing an example of the setting of a conversion table of the FIG. 16 code converter.

FIG. 23 illustrates the operation of FIG. 22 CLCC.

DETAILED DESCRIPTION OF THE INVENTION

Figure 1:
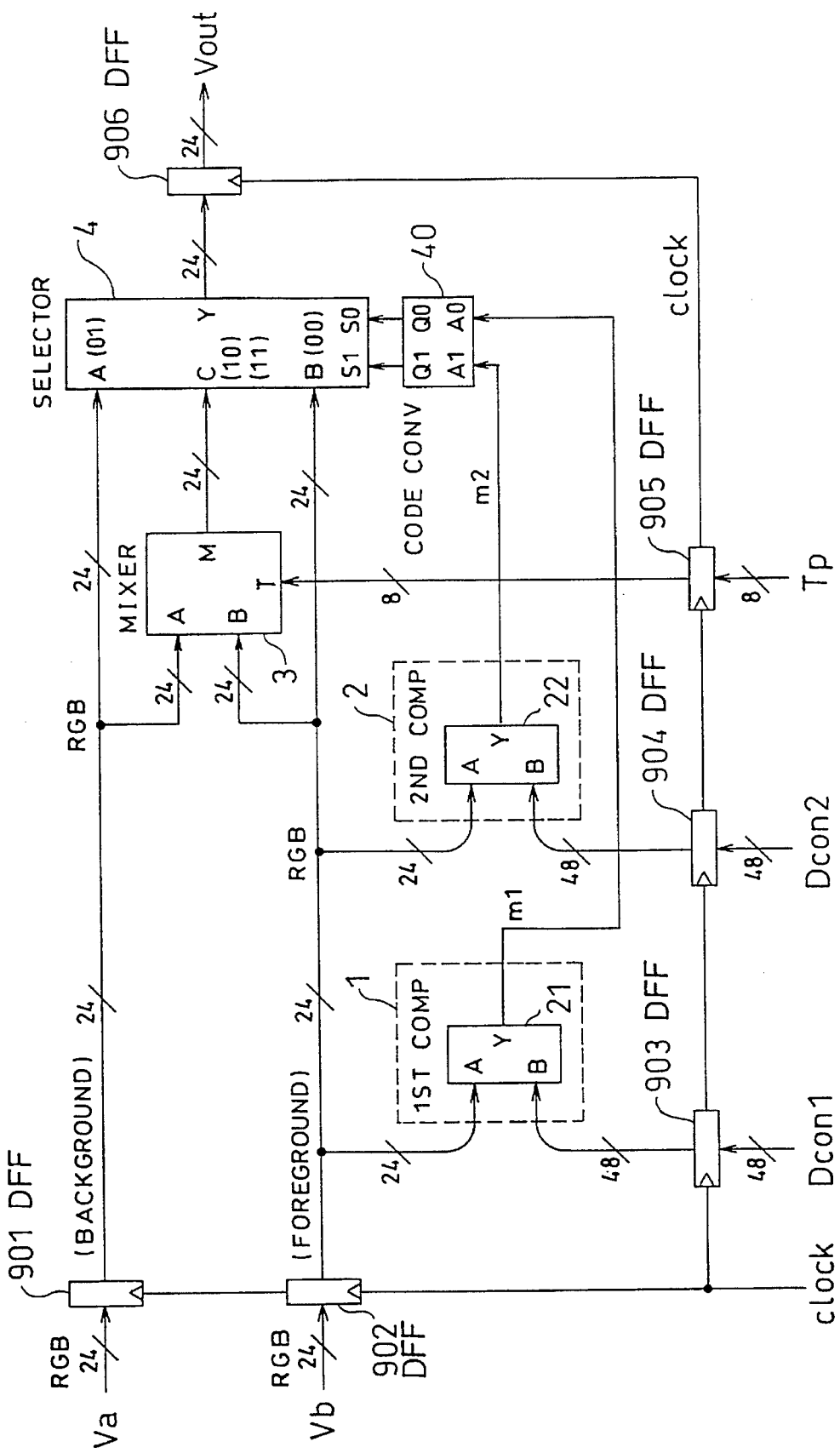
FIG. 1 is a diagram showing in block schematic form a CLCC in accordance with a first preferred embodiment of the present invention.

Preferred embodiments of the present invention will now be described below by making reference to the drawing figures.

EXAMPLE 1

FIG. 1 is a block diagram of a first CLCC of the present invention. Va, Vb, and Vout are video image data representing respective images of FIG. 6. Each of Va, Vb, and Vout is TV-size data of 640×480 pixels, each pixel having a red component of 8 bits, a green component of 8 bits, and a blue component of 8 bits. The live-video image data Va and Vb are input into the CLCC of FIG. 1 as follows. Va and Vb are input pixel by pixel in synchronism with a clock signal CLK in accordance with the order of non-interlaced scanning starting with the uppermost scanning line of the display screen and sweeping same from left to right. When the scanning gets to the rightmost pixel of the uppermost scanning line, it goes down to the leftmost pixel of the next scanning line and moves to the right. The non-interlaced scanning continues in this way, and when it finally gets to the rightmost pixel of the bottom scanning line, it then returns to where it was started. The non-interlaced scanning of Va and that of Vb are perfectly in phase with each other.

A mixing circuit 3, having three input terminals A, B, T and an output terminal M, receives input data DataA at the input terminal A, input data DataB at the input terminal B, and transparency data Tp at the input terminal T. In the mixing circuit 3, DataA and DataB are assigned respective weights, t and (1−t), and DataA and DataB are multiplied by the respective assigned weights, and the products are summed together to obtain an output M (=tA+(1−t)B) at the output terminal M. (t represents transparency, and $0 \leq t \leq 1$.) If t=0 (totally opaque), then M=B (foreground). If t=1 (totally transparent), then M=A (background). If 0<t<1, this produces a translucent composition effect. For the case of FIG. 1, each pixel of Va is made up of R of 8 bits, G of 8 bits, and B of 8 bits and each pixel of Vb is likewise made up of R of 8 bits, G of 8 bits, and B of 8 bits, so that the 8-bit R of Va and the 8-bit R of Vb (the 8-bit G of Va and the 8-bit G of Vb; the 8-bit B of Va and the 8-bit B of Vb) are multiplied by respective assigned weights and the results are summed together. The transparency t is supplied to the input terminal T in the form of the transparency data Tp composed of 8 bits. The transparency t=0 corresponds to T="00000000", and t=1 corresponds to T="11111111".

Figure 3:
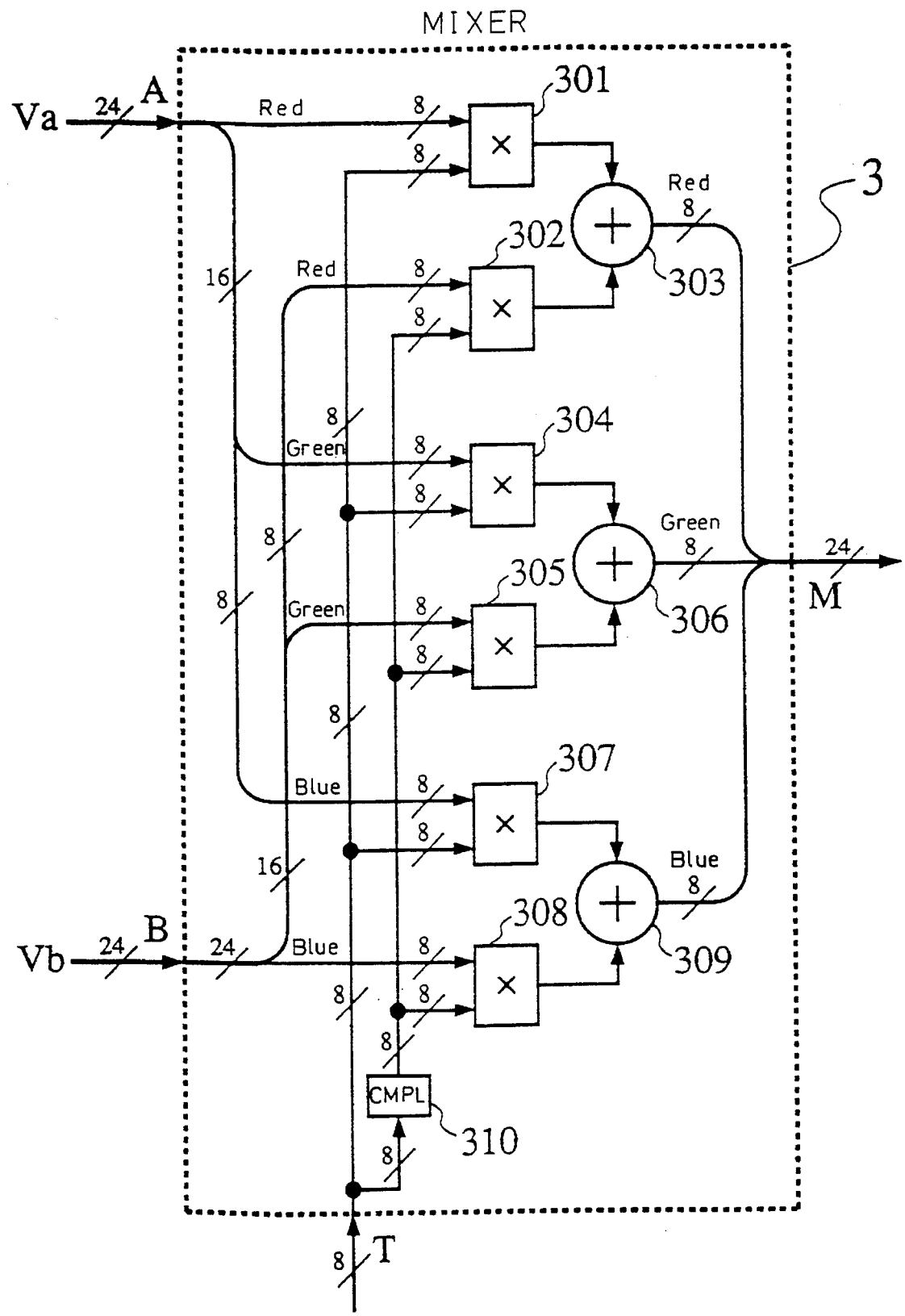
FIG. 3 is a circuit diagram showing an example of the configuration of a mixing circuit of FIG. 1.

FIG. 3 shows an example of the configuration of the mixing circuit 3. 301, 302, 304, 305, 307, and 308 are multipliers. Each multiplier 301, 302, 304, 305, 307, and 308 has two input terminals and an output terminal, each input terminal receiving an 8-bit signal. 303, 306, and 309 are adders. Each adder 303, 306, and 309 gives an output of 8 bits. 310 is a complement converter. The complement converter 310 converts t into (1−t). In other words, the complement converter 310 converts the 8-bit transparency data Tp supplied to the input terminal T into ("11111111"−T) and provides the converted data. More specifically, the complement converter 310 inverts all the bits of the transparency data Tp. The red component of Va and the red component of Vb are multiplied by respective weights by means of the multipliers 301, 302 and the products are summed together by means of the adder 303. The green component of Va and the green component of Vb are multiplied by respective weights by means of the multipliers 304, 305 and the products are summed together by means of the adder 306. The blue component of Va and the blue component of Vb are multiplied by respective weights by means of the multipliers 307, 308 and the products are summed together by means of the adder 309. For example, the output M of the mixing circuit 3 is written (T×Va+("11111111"−T)×Vb)/"11111111" in terms of the red component.

FIG. 1 shows a first condition-judging circuit 1. This first condition-judging circuit 1, having two input terminals A and B and an output terminal Y, receives input data DataA at the input terminal A and input data DataB at the input terminal B, and sends out a coincidence signal m1 from the output terminal Y if DataA meets conditions described by DataB. In the present embodiment, the first condition-judging circuit 1 is implemented by a first comparator 21. The first comparator 21 receives DataA and DataB to determine whether or not the value of DataA falls in a range defined by DataB. If the value of DataA falls in such a range, a coincidence signal of logical level "1" appears at the output Y. A second condition-judging circuit is indicated by reference number 2, and m2 is a coincidence signal. The second condition-judging circuit 2 is implemented by a second comparator 22. The second condition-judging circuit 2 is identical in configuration with the first condition-judging circuit 1. The second comparator 22 is identical in configuration with the first comparator 21. The coincidence signal m2 and the coincidence signal m1 are the same. The first comparator 21 is fed Vb and Dcon1 (i.e., the first condition data). The second comparator 22 is fed Vb and Dcon2 (i.e., the second condition data).

Figure 2:
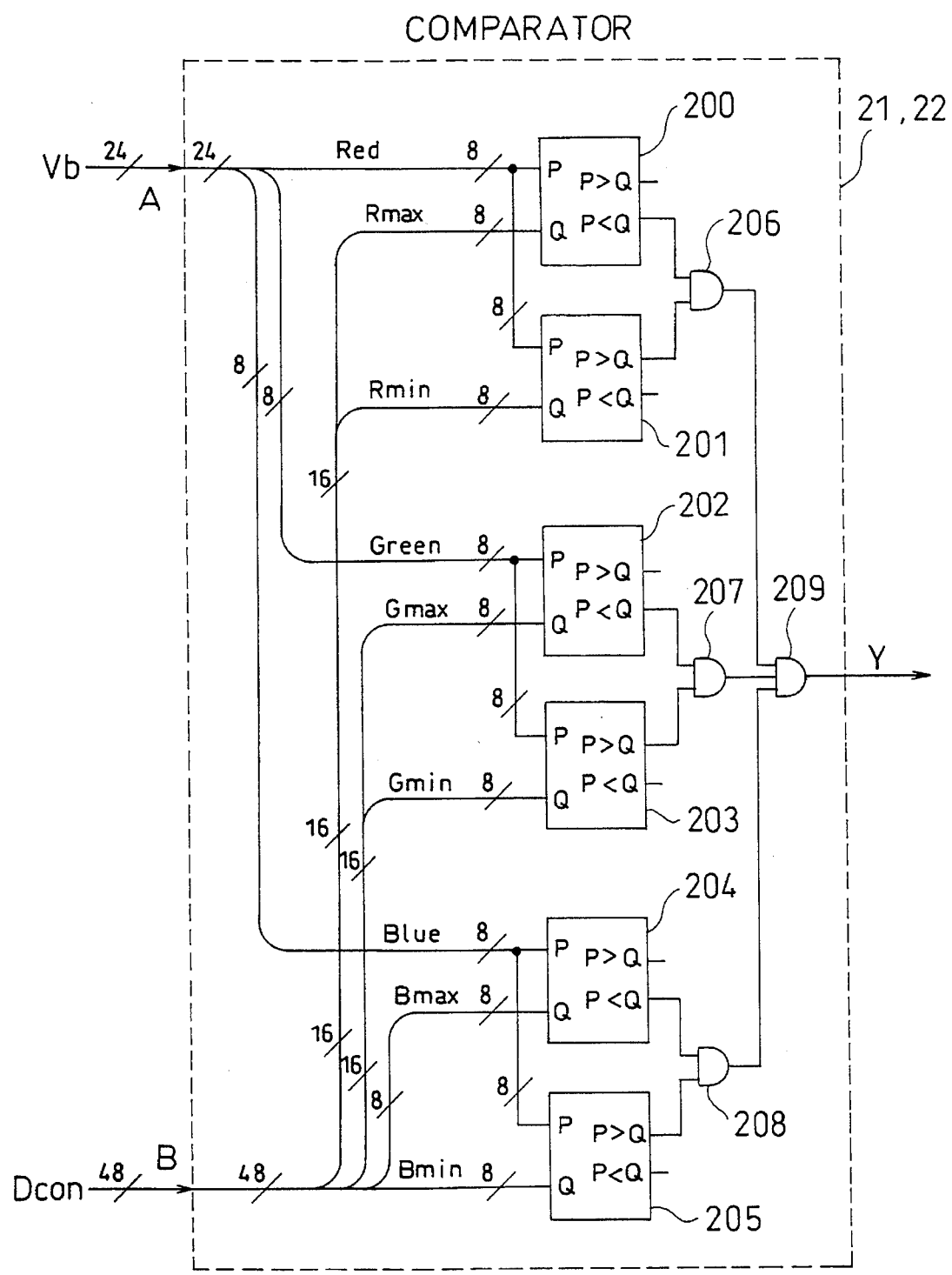
FIG. 2 is a circuit diagram showing an example of the configuration of comparators of FIG. 1.

Referring now to FIG. 2, the configuration of the first and second comparators 21, 22 is described. 200–205 are magnitude comparators known in the art. Each magnitude comparator 200–205 receives input data P and input data Q, thereby making a comparison in magnitude between the input data P and the input data Q. If the input data P is found greater than or equal to the input data Q, then P>Q="1" and P<Q="0". If the input data P is found less than input data Q, then P>Q="0" and P<Q="1". 206–209 are AND gates known in the art. The live-video image data Vb, composed of red, green, and blue components each represented by 8 bits of information, is applied at the input terminal A of the first comparator 21. The first condition data Dcon1 of 48 bits is applied at the input terminal B of the first comparator 21; that is, Rmax, Gmax, Bmax and Rmin, Gmin, Bmin (i.e., the upper- and lower-limit values of the input RGB components, each value being composed of 8 bits) are applied at the input B of the first comparator 21. If the value of the pixel data applied at the input terminal A of the comparator 21 satisfies Rmin≦Red≦Rmax, Gmin≦Green≦Gmax, and Bmin≦Blue≦Bmax, then a signal of logical level "1" appears at the output terminal Y of the comparator 21 (otherwise, a signal of logical level "0" appears at the output terminal Y).

In FIG. 1, a data selector 4, having three input terminals A, B, and C for receiving respective input signals A, B, and C and an output terminal Y, is shown. This data selector 4 determines which of these three input signals to be provided as its output Y at the output terminal Y according to selection control input signals S1 and S0. If S1=0 and S0=1, then the input signal A is selected and appears as the output Y at the output terminal Y. This is expressed "A(01)" in the figure. If S1=0 and S0=0, then the input signal B is selected and appears as the output Y at the output terminal Y. In cases other than the above, the input signal C is selected and appears as the output Y at the output terminal Y. More specifically, the three input terminals A, B, and C of the data selector 4 receive Va (the background live-video image), Vb (the foreground live-video image), and the output of the mixing circuit 3, respectively.

Figure 4:
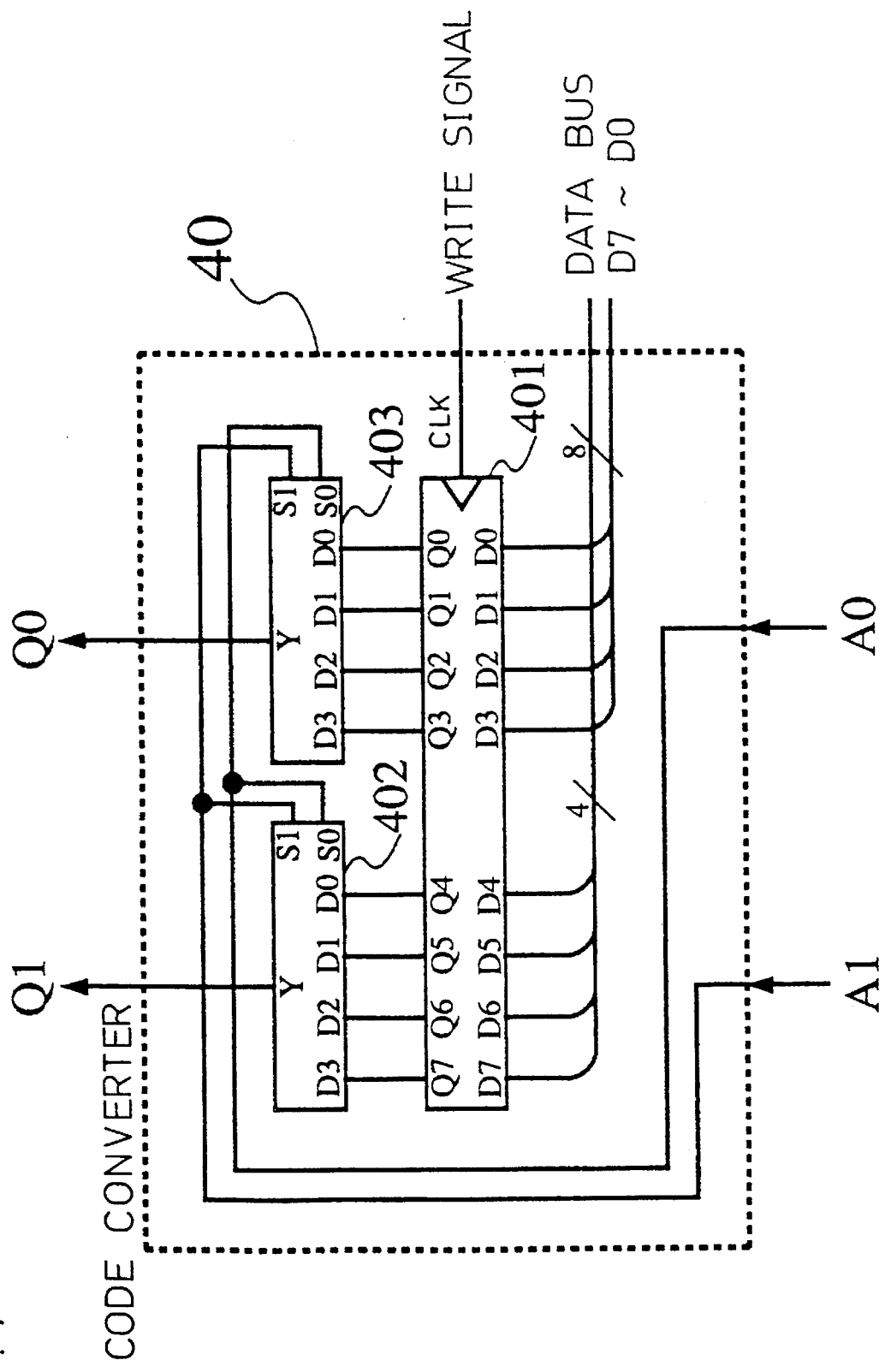
FIG. 4 is a circuit diagram showing an example of the configuration of a code converter of FIG. 1.

40 indicates a programmable code converter. The code converter 40 converts a code composed of the coincidence signals m1 and m2 from the first and second condition-judging circuits 1 and 2 and provides the result of the code-conversion. FIG. 4 shows an example of the configuration of the code converter 40. 401 is an 8-bit D-type flip-flop known in the art. 402 and 403 are data selectors also known in the art. By writing into the D-type flip-flop 401 data for code conversion via an 8-bit data bus formed by signal lines D7-D0, conversion rules (i.e., a conversion table) can be set with greater latitude. Three examples of the setting of the conversion of A1, A0 into Q1, Q0 are shown in FIGS. 5A–5C. For example, in the FIG. 5A setting example, A1 and A0 straightforwardly become Q1 and Q2 without undergoing any conversion (non-conversion). Then, "11001010" has been written into the D-type flip-flop 401.

In FIG. 1, 901–906 are D-type flip-flops capable of holding and providing their respective input data on the rising-edge of the CLK. The D-type flip-flop 901 holds and provides Va (the background live-video image data of 24 bits). The D-type flip-flop 902 holds and provides Vb (the foreground live-video image data of 24 bits). The D-type flip-flop 903 holds and provides Dcon1 (the first condition data of 48 bits). The D-type flip-flop 904 holds and provides Dcon2 (the second condition data of 48 bits). The D-type flip-flop 905 holds and provides Tp (the transparency data of 8 bits). The D-type flip-flop 906 holds and provides Vout (the mixed live-video image output of 24 bits).

Figure 6:
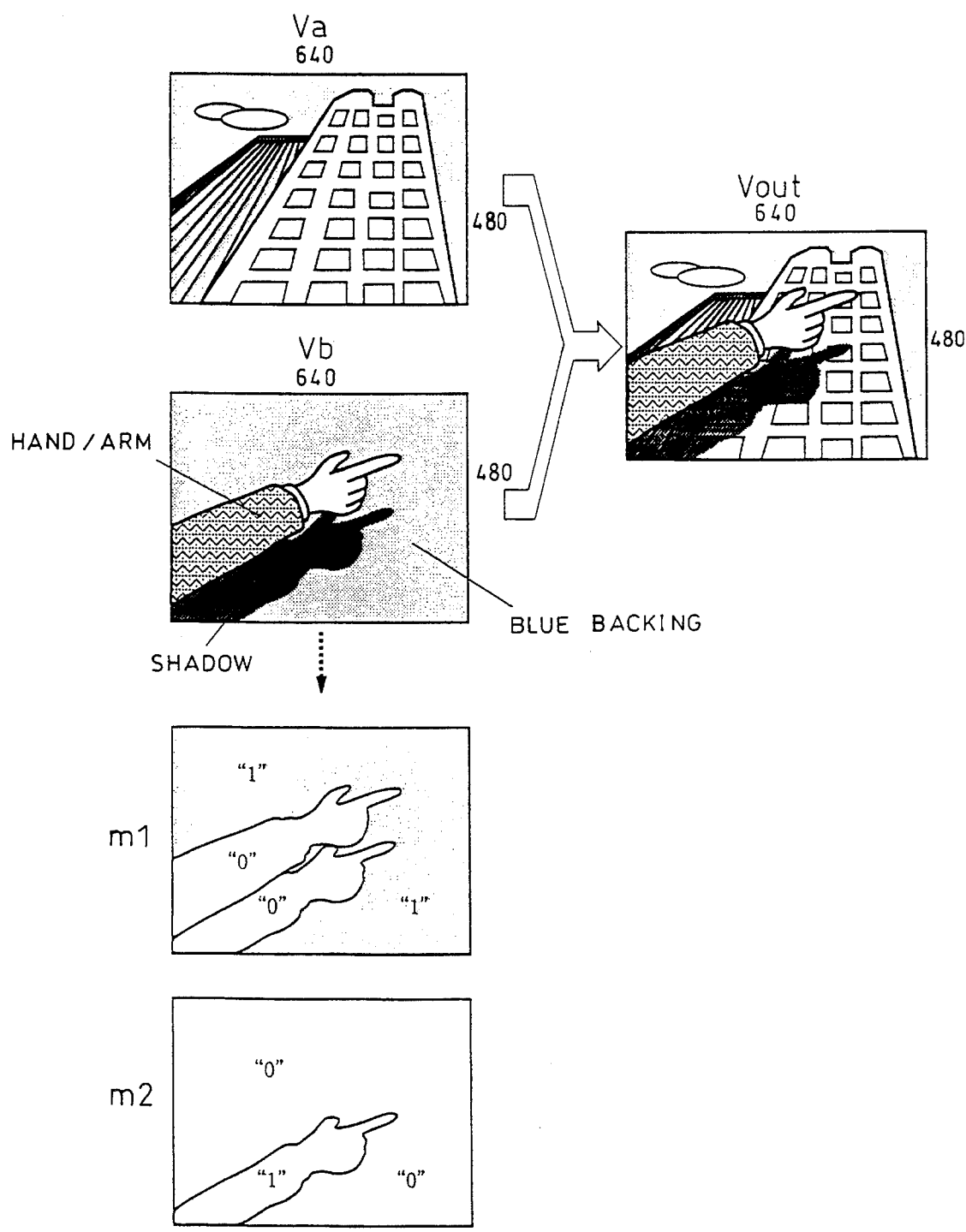
FIG. 6 illustrates the chroma-key live-video compositing operation of the FIG. 1 CLCC in the case of employing the FIG. 5A conversion table.

By making reference to FIG. 6, the operation of the embodiment of FIG. 1 will now be described. The background live-video image data Va of FIG. 6 is input to the D-type flip-flop 901 pixel by pixel in synchronism with the CLK. A screen for visually displaying the data Va is made up of 640×480 pixels, each pixel having RGB components (8 bits each). The foreground live-video image data Vb of FIG. 6 is input to the D-type flip-flop 902 pixel by pixel in synchronism with the CLK. Pixel data at the same scan positions are input synchronously.

The first condition data Dcon1, on the one hand, carries the upper- and lower-limit values of color data within a range covering a color representing a "blue back" of Vb. For example, if the distribution range of the color data of the "blue back" is Red=Rmin~Rmax= "00000000"~"00000010", Green=Gmin~Gmax= "00000000"~"00000010", and Blue=Bmin~Bmax= 11111100"~"11111111", then the first condition data Dcon1=Rmin·Rmax·Gmin·Gmax·Bmin·Bmax="00000000 00000010 00000000 00000010 11111100 11111111". The second condition data Dcon2, on the other hand, carries the upper- and lower-limit values of color data within a range covering a color representing a "shadow" of Vb. For example, if the distribution range of the color data of the "shadow" is Red=Rmin~Rmax="00000000"~00000001", Green=Gmin~Gmax="00000000"~"00000001", and Blue= Bmin~Bmax="1000000"~"11110000", then the second condition data Dcon2=Rmin·Rmax·Gmin·Gmax·Bmin·Bmax= "00000000 00000001 00000000 00000001 10000000 11110000".

When one-pixel data of Va is fed to the D-type flip-flop 901, one-pixel data of Vb is fed to the D-type flip-flop 902, the first condition data Dcon1 is fed to the D-type flip-flop 908, the second condition data Dcon2 is fed to the D-type flip-flop 904, and the transparency data Tp is fed to the D-type flip-flop 905, the mixing circuit 3 translucency-composites Vb over Va according to the transparency data Tp and outputs a result of the translucent composition processing. Because the first condition data Dcon1 is set as above, the first condition-judging circuit 1 sends out a coincidence signal of logical level "1", only when pixels of the "blue back" of Vb (see FIG. 6) are input. Further, because the second condition data Dcon2 is set as above, the second condition-judging circuit 2 sends out a coincidence signal of logical level "1", only when pixels of the "shadow" of Vb are input (see FIG. 6). The coincidence signals m2 and m1 from the second and first condition-judging circuits 2 and 1 become "0" and "1" in the "blue back" of Vb, and become "0" and "0" in the "hand/arm" of Vb, and become "1" and "0" in the "shadow" of Vb (in this example, "1"/"1" regions hardly occur). If the code converter 40 is set according to FIG. 5A (i.e., the pass-without-conversion), the D-type flip-flop 906 provides a mixed live-video image output (i.e., the Vout of FIG. 6) on the next clock signal. In comparison with a prior art technique (see the Vout of the FIG. 23), the Vout of FIG. 6 has a translucent composition effect, so that the "shadow" of the hand/arm becomes translucent revealing a corresponding underlying part that has not been made visible by the conventional technique. This casts a "shadow" onto the background in such a way as to obscure nothing underneath it, thereby making the presentation look very natural.

Next, if the code converter 40 is set according to FIG. 5B, this causes the data selector 4 to select the output of the mixing circuit 3, even when both the coincidence signals m2 and m1 are signals of logical level "0". This provides the Vout of FIG. 7 in which both the "shadow" and the "hand/arm" are displayed to be translucent. As a result, the whole background is revealed, thereby making it possible to display on the screen all the information required. The effect of presentation and pointing can be improved.

EXAMPLE 2

Figure 8:
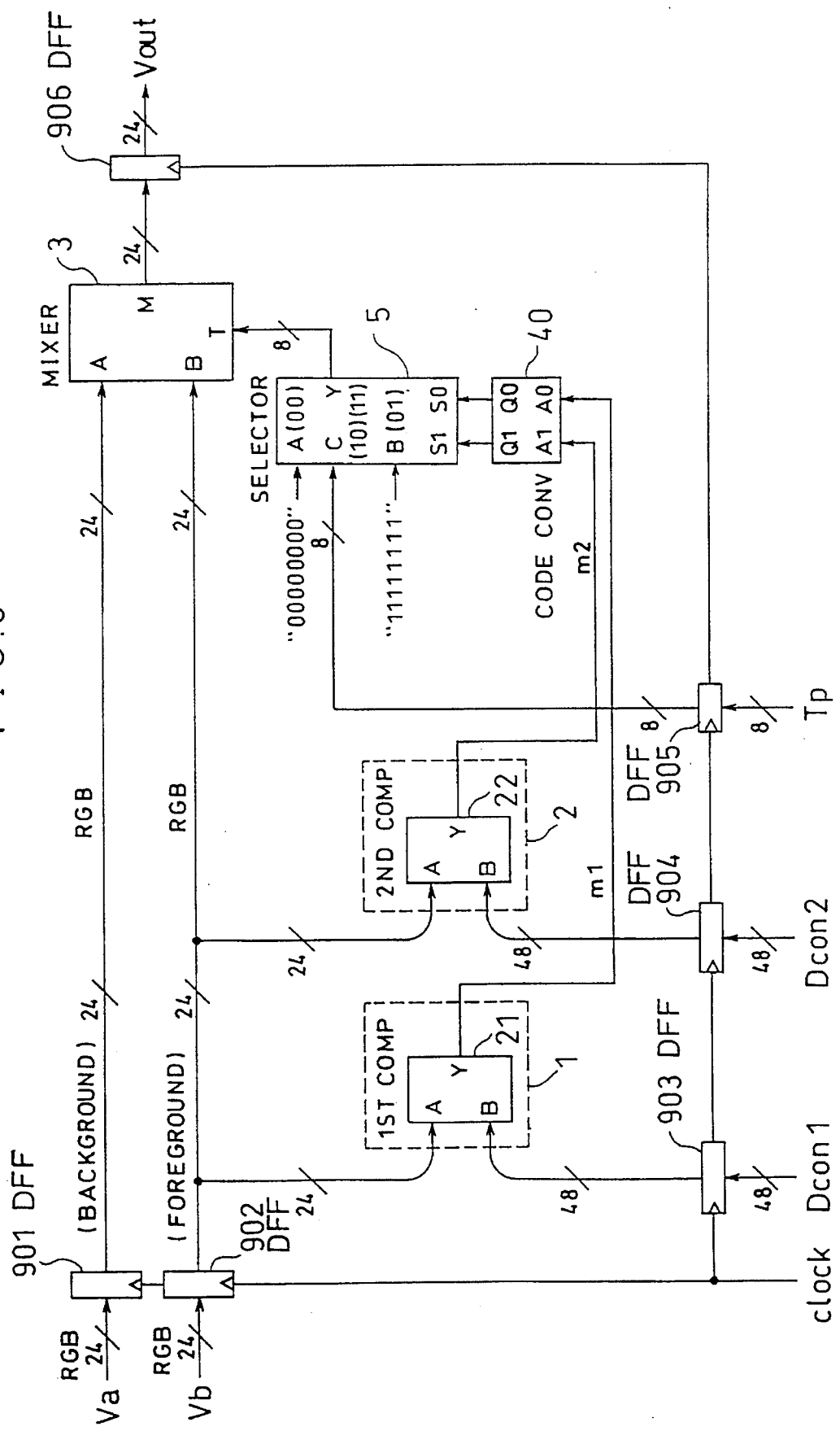
FIG. 8 is a diagram showing in block schematic form a CLCC in accordance with a second preferred embodiment of the present invention.

FIG. 8 is a block diagram of a second CLCC of the present invention. In the second preferred embodiment, the 24-bit data selector 4 of FIG. 1 for selectively providing pixel data is replaced with an 8-bit data selector 5 for selectively providing transparency data. In other words, the same functions as accomplished by the first embodiment can be obtained by the second embodiment with a less amount of hardware.

The data selector 5 of FIG. 8 is a selector, having three input terminals A, B, and C to receive respective input signals A, B and C and an output terminal Y, for determining which of these three input signals to be provided as its output Y at the output terminal Y according to the selection control input signals S1 and S0. If S1=0 and S0=0, then the input signal A is selected and appears as the output Y at the output terminal Y. If S1=0 and S0=1, then the input signal B is selected and appears as the output Y at the output terminal Y. In cases other the above, the input signal C is selected and appears as the output Y at the output terminal Y. The minimum of the transparency data, "00000000" (i.e., the opacity data), is applied at the input terminal A of the data selector 5, and the maximum of the transparency data, "11111111" (i.e., the total transparency data), is applied at the input terminal B, and the transparency data Tp in synchronism with the CLK is applied at the input terminal C. The output Y of the data selector 5 is fed to the mixing circuit 3.

Figure 7:
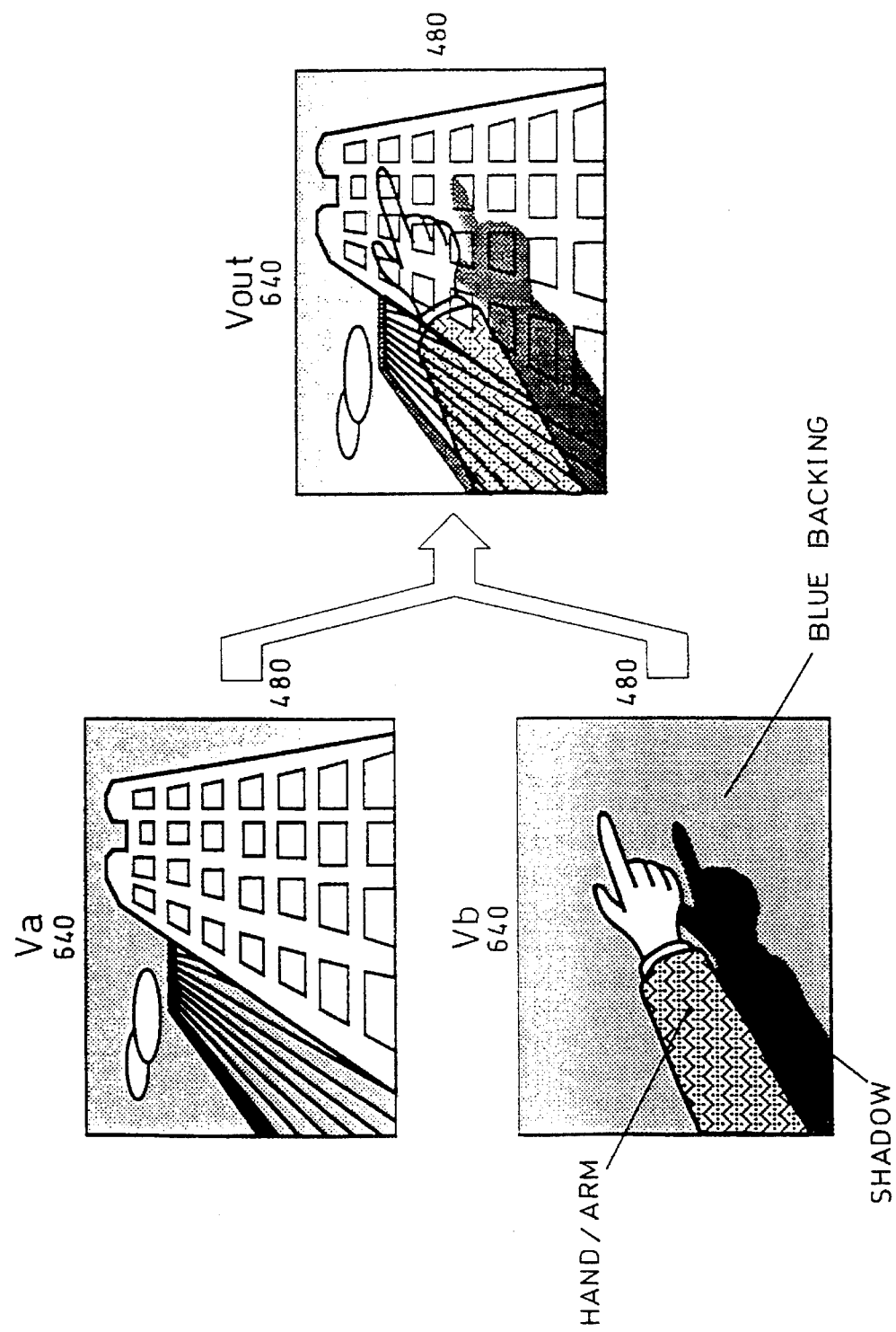
FIG. 7 illustrates the chroma-key live-video compositing operation of the FIG. 1 CLCC in the case of employing the FIG. 5B conversion table.

The operation of the embodiment of FIG. 8 will be described which is the same as the operation of the embodiment of FIG. 1 up to where the code converter 40 gives its output. The data selector 5 provides its output Y to the mixing circuit 3 as a transparency signal. As a result, the Vout of FIG. 6 is obtained if the code converter 40 is set according to FIG. 5A. Alternatively, the Vout of FIG. 7 is obtained if the code converter 40 is set according to FIG. 5B.

EXAMPLE 3

Figure 9:
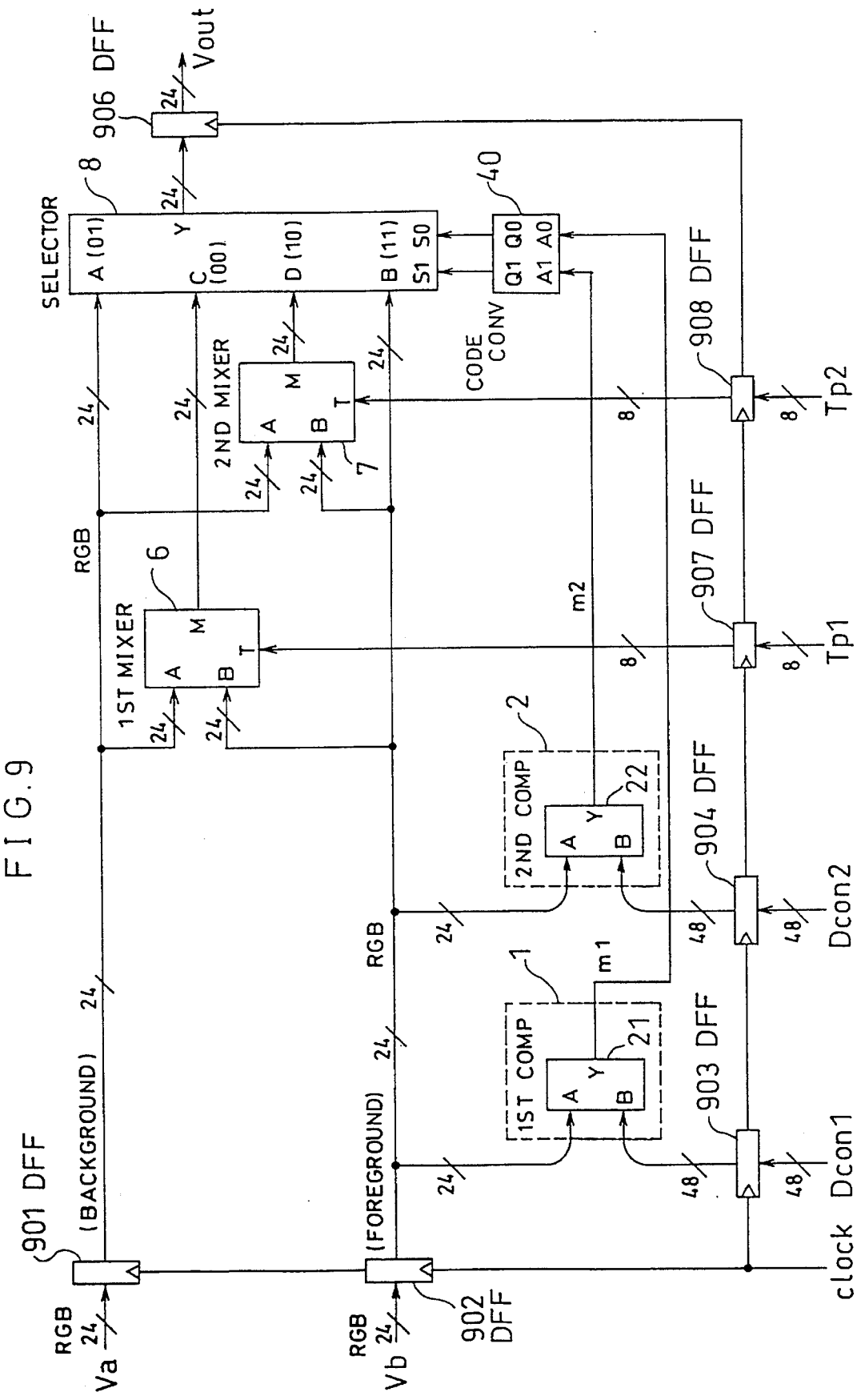
FIG. 9 is a diagram showing in block schematic form a CLCC in accordance with a third preferred embodiment of the present invention.

FIG. 9 is a block diagram of a third CLCC of the present invention. The present embodiment is a revision of the first embodiment. In the present embodiment, the first transparency data Tp1 and the second transparency data Tp2 are employed. The present embodiment differs from the first embodiment in that the number of mixing circuits increases from one to two, and thus a data selector with not three input terminals but four input terminals is used.

FIG. 9 shows a first mixing circuit 6 and a second mixing circuit 7. Each mixing circuit 6, 7 is identical in function with the mixing circuit 3 of FIG. 1. A D-type flip-flop 907 sends out the first transparency data Tp1 to the first mixing circuit 6 in synchronism with the CLK, and a D-type flip-flop 908 sends out the second transparency data Tp2 to the second mixing circuit 7 in synchronism with the CLK. A data selector 8, having four input terminals A, B, C, and D to receive respective input signals A, B, C, and D and an output terminal Y, is a selector for determining which of these four input signals to be provided as its output Y at the output terminal Y according to S1 and S0. If S1=0 and S0=1, then the input signal A is selected and appears as the output Y at the output terminal Y. If S1=1 and S0=1, then the input signal B is selected and appears as the output Y at the output terminal Y. If S1=0 and S0=0, then the input signal C is selected and appears as the output Y at the output terminal Y. If S1=1 and S0=0, then the input signal D is selected and appears as the output Y at the output terminal Y. The background live-video image Va, the foreground live-video image Vb, the output of the first mixing circuit 6, and the output of the second mixing circuit 7 are applied at the input terminals A, B, C, and D of the data selector 8, respectively.

The operation of the embodiment of FIG. 9 will be described below. As in the first embodiment (see FIG. 1), the background and foreground live-video image data Va and Vb representing the respective images of FIG. 7 are input. The first condition data Dcon1, on the one hand, carries the upper- and lower-limit values of color data within a range covering a color representing a "blue back" of Vb. The second condition data Dcon2, on the other hand, carries the upper- and lower-limit values of color data within a range covering a color representing a "shadow" of Vb. If the code converter 40 is set according to FIG. 5A (i.e., the pass-without-conversion), the result of the translucent composition, performed by the first mixing circuit 6 on the "hand/arm" according to the transparency data Tp1, and the result of the translucent composition, performed by the second mixing circuit 7 on the "shadow" according to the second transparency data Tp2 are reflected in the Vout of FIG. 7.

Additionally, the "hand/arm" is translucent to such a degree corresponding to the first transparency data Tp1 (for example, 30% transparency=not very transparent), while on the other hand the "shadow" is translucent to such a degree corresponding to the second transparency data Tp2 (for example, 80% transparency=almost transparent). In other words, the "hand/arm" and the "shadow" have different degrees of transparency, thereby providing a more naturally looking mixed image. More effective presentation can be made.

In a region included in the "blue back" as well as in the "shadow", S1=1 and S0=1. However, such an "S1=1 and S0=1" region is a region that should not occur originally. If, however, key colors described by Dcon1 and Dcon2 (i.e., the chroma-key condition data) are excessively broadened, this causes an overlapped region to appear along the boundaries of the "shadow" and Vb (foreground) becomes visible at such a boundary region where it is not expected to be seen. In such a case, if the code converter 40 is set according to FIG. 5C, then Va (background) is provided to Vout, even when S1=1 and S0=1, thereby preventing Va from being obscured by Vb.

EXAMPLE 4

Figure 10:
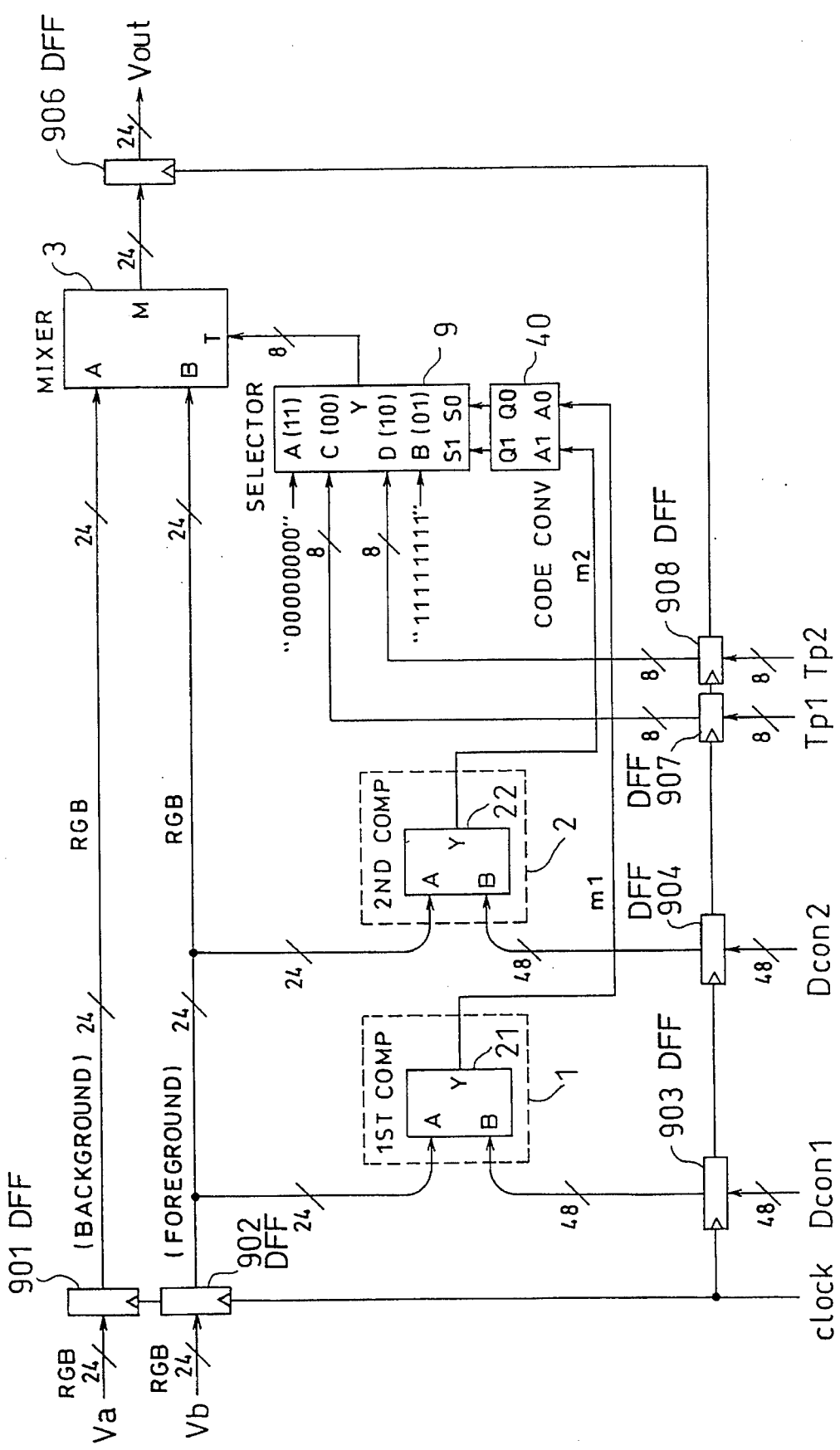
FIG. 10 is a diagram showing in block schematic form a CLCC in accordance with a fourth preferred embodiment of the present invention.

FIG. 10 is a block diagram of a fourth CLCC of the present invention. In the fourth preferred embodiment, the first and second mixing circuits 6, 7, and the 24-bit data selector 8 for selectively providing pixel data of FIG. 9 are not employed. Instead, a mixing circuit 3, and an 8-bit data selector 9 for selectively providing transparency data are employed. In other words, in the fourth embodiment, the same functions as performed by the third embodiment can be obtained with a less amount of hardware.

The data selector 9 of FIG. 10 is a selector, having four input terminals A, B, C, and D to receive respective input signals A, B, C, and D and an output terminal Y, for determining which of these four input signals to be provided as its output Y at the output terminal Y according to the selection control input signals S1 and S0. If S1=1 and S0=1, then the input signal A is selected and appears as the output Y at the output terminal Y. If S1=0 and S0=1, then the input signal B is selected and appears as the output Y at the output terminal Y. If S1=0 and S0=0, then the input signal C is selected and appears as the output Y at the output terminal Y. If S1=1 and S0=0, then the input signal D is selected and appears as the output Y at the output terminal Y. The minimum of the transparency data, "00000000" (i.e., the opacity data) is applied at the input terminal A of the data selector 9, and the maximum of the transparency data, "11111111" (i.e., the total transparency data) is applied at the input terminal B, and the first transparency data Tp1 in synchronism with the CLK is applied at the input terminal C, and the second transparency data Tp2 in synchronism with the CLK is applied at the input terminal D. The output Y of the data selector 9 is fed to the mixing circuit 3.

The operation of the embodiment of FIG. 10 will be described which is the same as the operation of the embodiment of FIG. 9 up to where the code converter 40 gives its output. The data selector 9 provides the above-described output Y to the mixing circuit 3 as a transparency signal, as a result of which, if the code converter 40 is set according to FIG. 5A (i.e., the pass-without-conversion), the Vout of FIG. 7 is obtained, with the "hand/arm" and the "shadow" displayed having different degrees of transparency.

In each of the above-described preferred embodiments of the present invention, the first and second comparators 21, 22 are designed in such a way as to send out a coincidence signal of logical level "1" when the input data A meets conditions described by the condition data B. However, a coincidence signal of logical level "0" may be output when the input data A meets conditions described by the condition signal B, and a signal of logical level "1" may be output to indicate that the conditions are not met. Additionally, the selection rules of each data selector 4, 5, 8, 9 may be designed freely. If the selection rules are set to a certain application program, this eliminates the need for the provision of the code converter 40.

Each of the first to fourth embodiments has two condition-judging circuits for monitoring pixel data of the foreground live-video image (Vb) and sending out a coincidence signal (i.e., a key signal) when the predefined conditions are met, and, correspondingly, the data selector has three or four alternatives for its output. If there are three or more colors to be extracted as a key, the number of condition-judging circuits should increase with the number of colors to be extracted as a key. For example, if the number of key colors is three (e.g., bright blue, dark blue, and bright green), this requires three condition-judging circuits. These three key colors are described by respective condition data (i.e., Dcon1, Dcon2, Dcon3) and are supplied to the selection control input terminals S2, S1, S0 of the data selector. There are 2×2×2=8 ways to change each pixel, so that the number of alternatives of the data selector for its output can be increased. When chroma-key compositing the "hand/arm" to be opaque and the "shadow" to be translucent, lighting may cause the color of a part of the "hand/arm" to fall in the set color range of the "blue back". As a result, the part of the "hand/arm" will become translucent. However, such an unwanted transparent part of the "hand/arm" can be made opaque by narrowing the set color range of the "blue back" and providing a plurality of condition-judging circuits for determining the color range of the "hand/arm".

EXAMPLE 5

Figure 11:
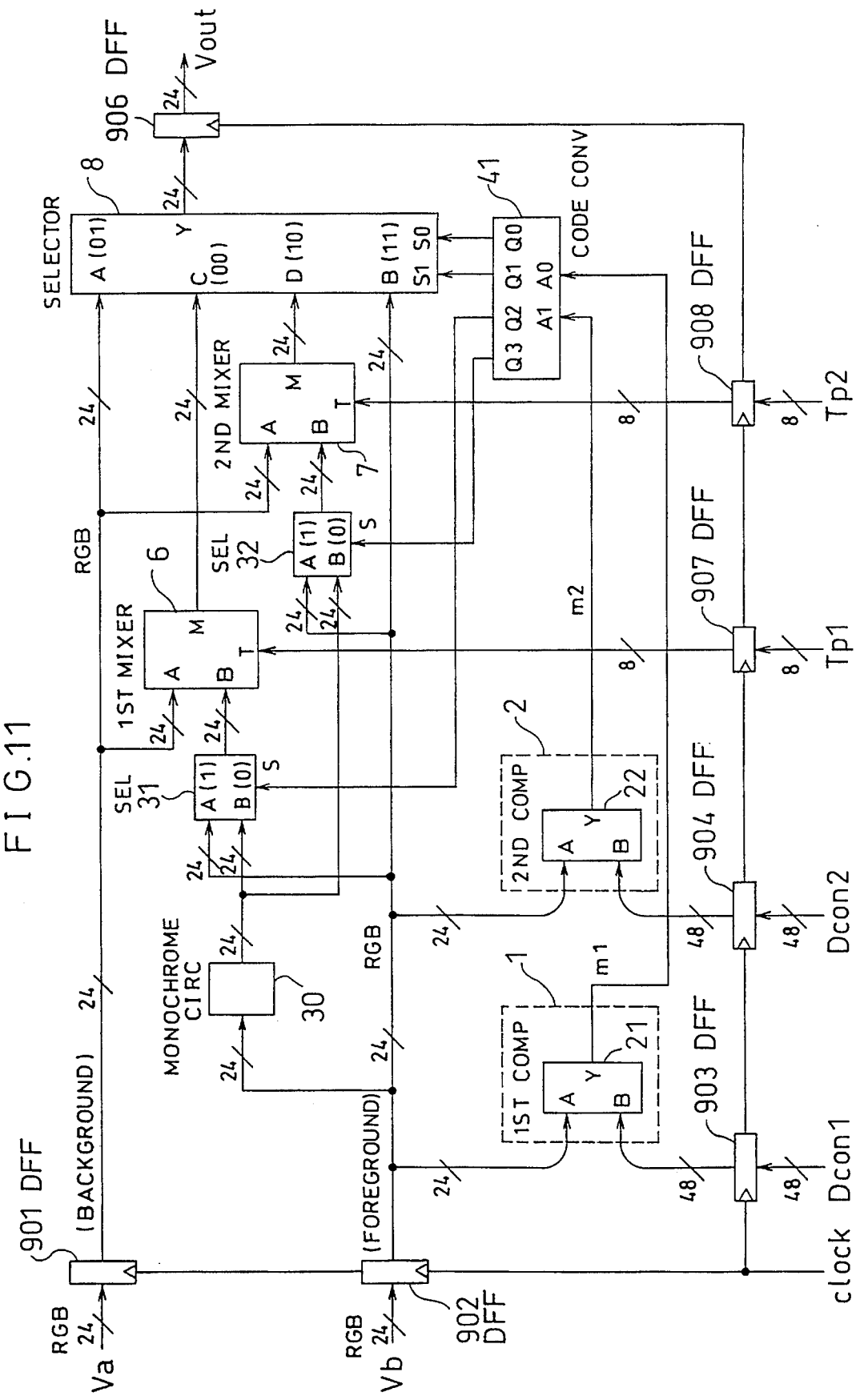
FIG. 11 is a diagram showing in block schematic form a CLCC in accordance with a fifth preferred embodiment of the present invention.

FIG. 11 is a diagram showing in block schematic form a fifth CLCC of the present invention. The fifth embodiment does not employ the code converter 40 of FIG. 9. The fifth CLCC has the following components: a monochromizing circuit 30; data selectors 31, 32; and a 4-bit-output code converter 41. Upon receipt of Vb containing color information, the monochromizing circuit 30 removes the color information from the input live-video image data and provides resultant data carrying only the luminance (gray) components. The data selector 31 receives the monochromized Vb from the monochromizing circuit 30 and the original Vb not monochromized, selects one of these two inputs, and provides the selection to the input terminal B of the first mixing circuit 6. The data selector 32 likewise receives the monochromized Vb from the monochromizing circuit 30 and the original Vb not monochromized, selects one of these two inputs, and provides the selection to the input terminal B of the second mixing circuit 7. This casts a complete monochrome (gray) "shadow" onto the background, eliminating unnatural colors (e.g., blue). As a result, more natural translucent video effects can be realized.

Figure 12:
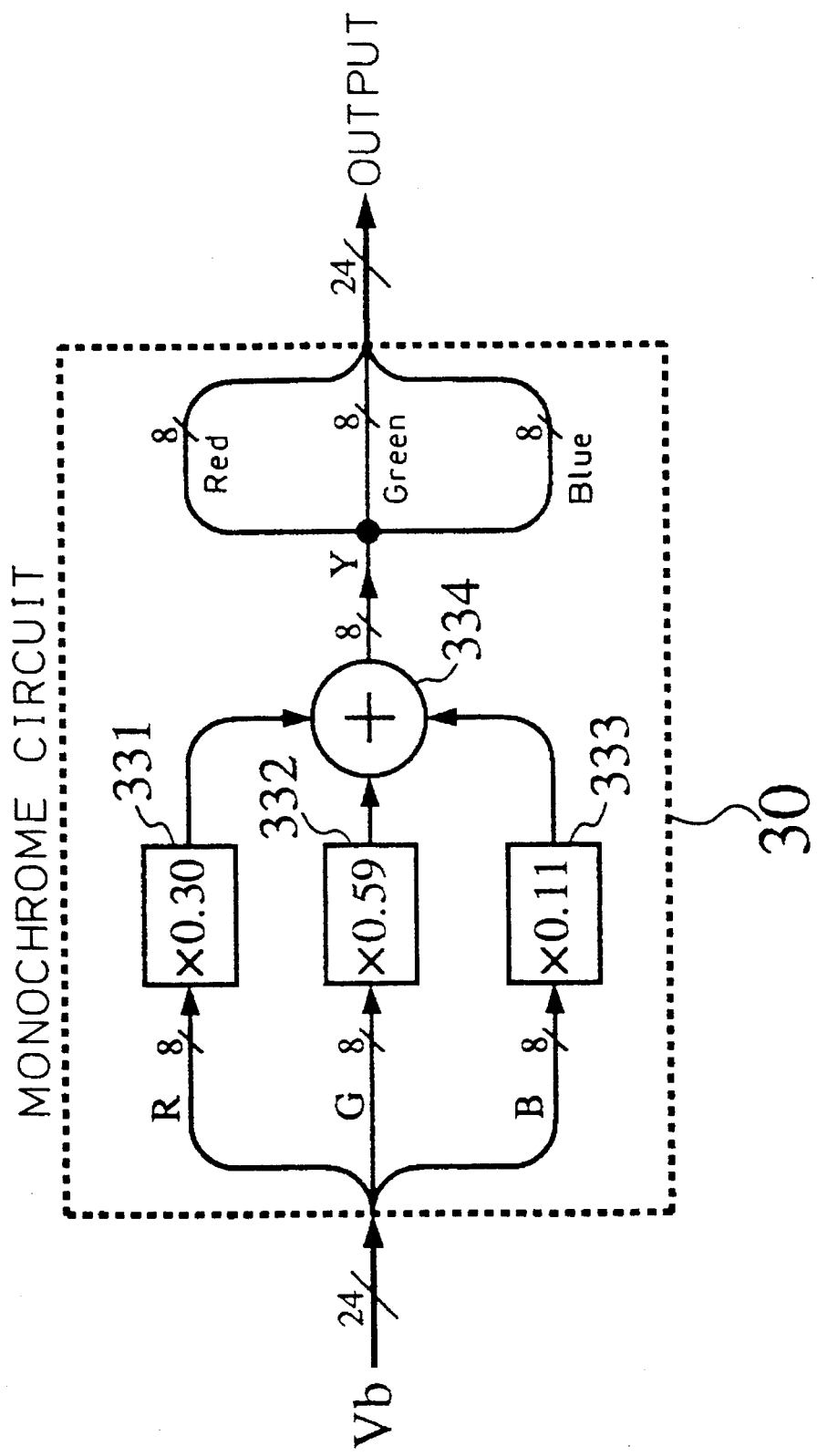
FIG. 12 is a diagram showing an example of the configuration of a monochromizing circuit of FIG. 11.

FIG. 12 shows an example of the configuration of the monochromizing circuit 30. 331 is a ×0.30 coefficient circuit for multiplying its input data by a coefficient of 0.30. 332 is a ×0.59 coefficient circuit for multiplying its input data by a coefficient of 0.59. 333 is a ×0.11 coefficient circuit for multiplying its input data by a coefficient of 0.11. 334 is an adder with three input terminals. The adder 334 receives the outputs of the coefficient circuits 331–333, summing those outputs, and provides a result composed of 8 bits. The monochromizing circuit 30 receives each pixel of the foreground live-video image data Vb composed of RGB of 8 bits each (8 bits×3=24 bits), so that an 8-bit output data from the adder 334 is triply overlapped to provide an apparent 24-bit output. For example, if Vb="11111111(R) 11111111(G) 00000000(B)" (yellow) is fed to the monochromizing circuit 30, the adder 334 provides "11100011". The output of the monochromizing circuit 30 (24 bits) is "11100011(R) 11100011(G) 11100011(B)". The coefficients of the coefficient circuits 331, 332, and 333 are values based on a known conversion formula for conversion from an RGB signal into a Y/C (luminance/chrominance) signal, $Ey=0.30Er+0.59Eg+0.11Eb$. Other coefficient values may be used.

Figure 21:
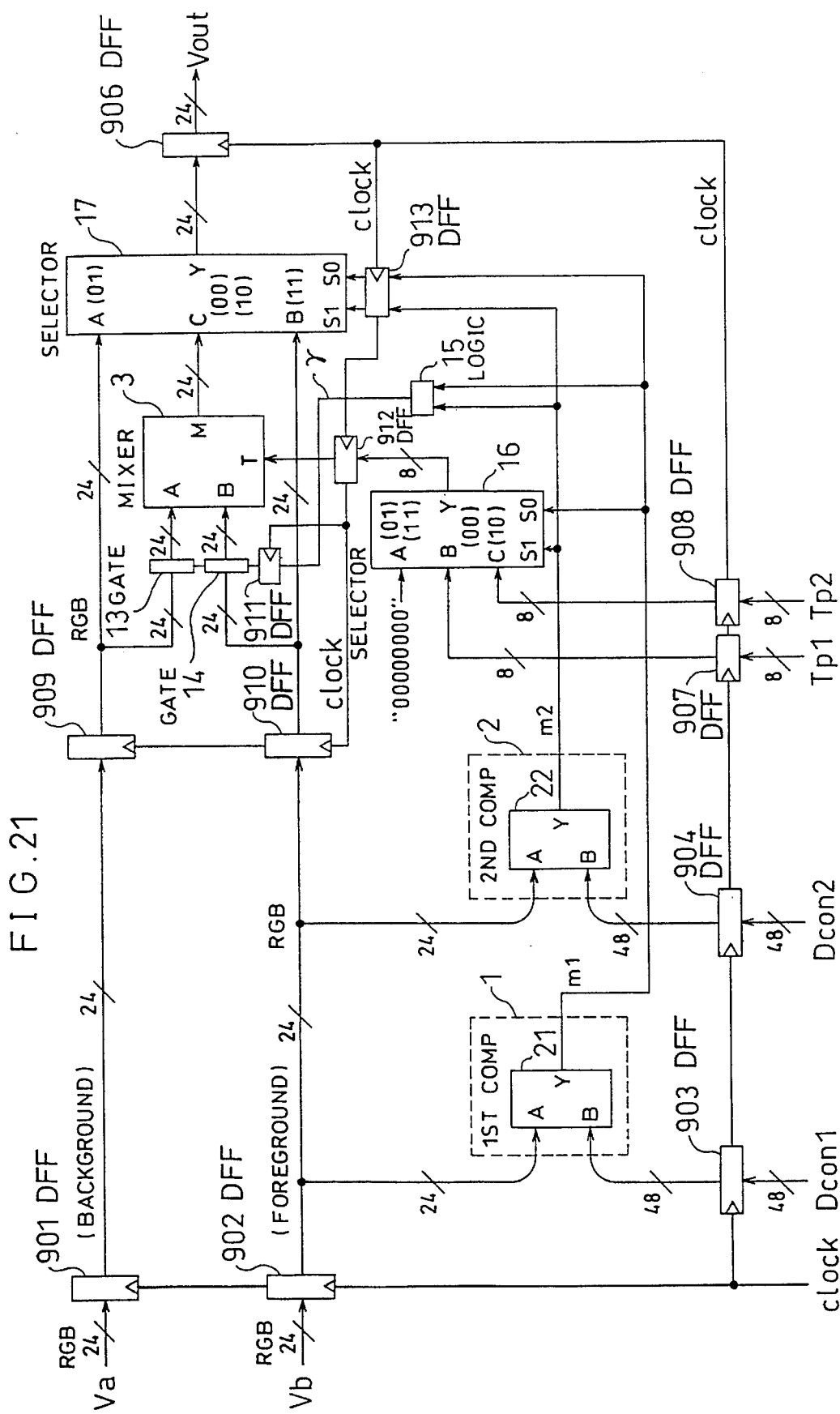
FIG. 21 is a diagram showing in block schematic form a CLCC in accordance with an eighth preferred embodiment of the present invention.
Figure 22:
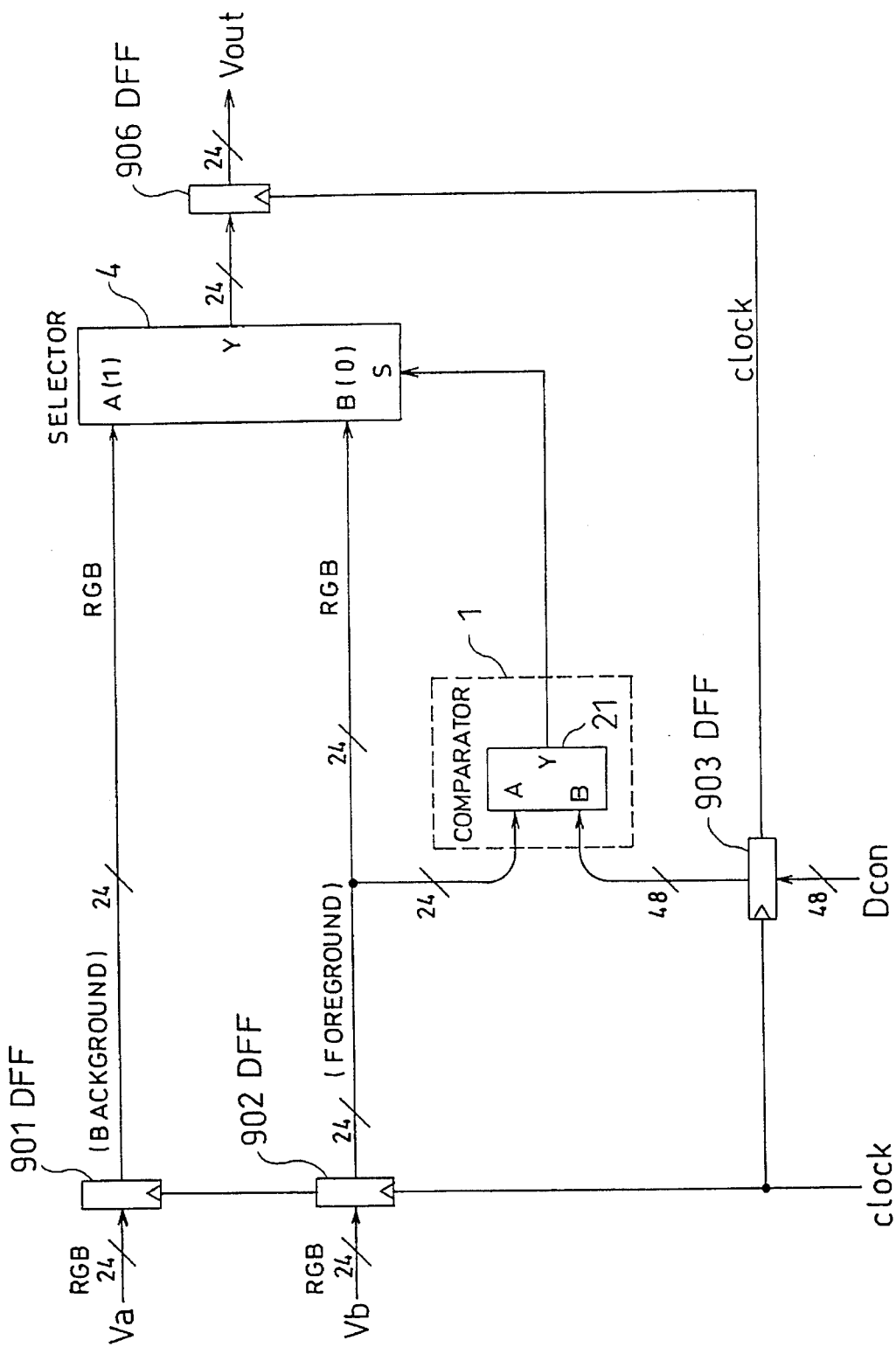
FIG. 22 is a diagram showing in block schematic form a conventional CLCC.

Both of the data selectors 31 and 32 are identical in structure with the data selector 4 of FIG. 21. Each data selector 31, 32 provides the input signal B if S=0, and the input signal A if S=1.

Figure 13:
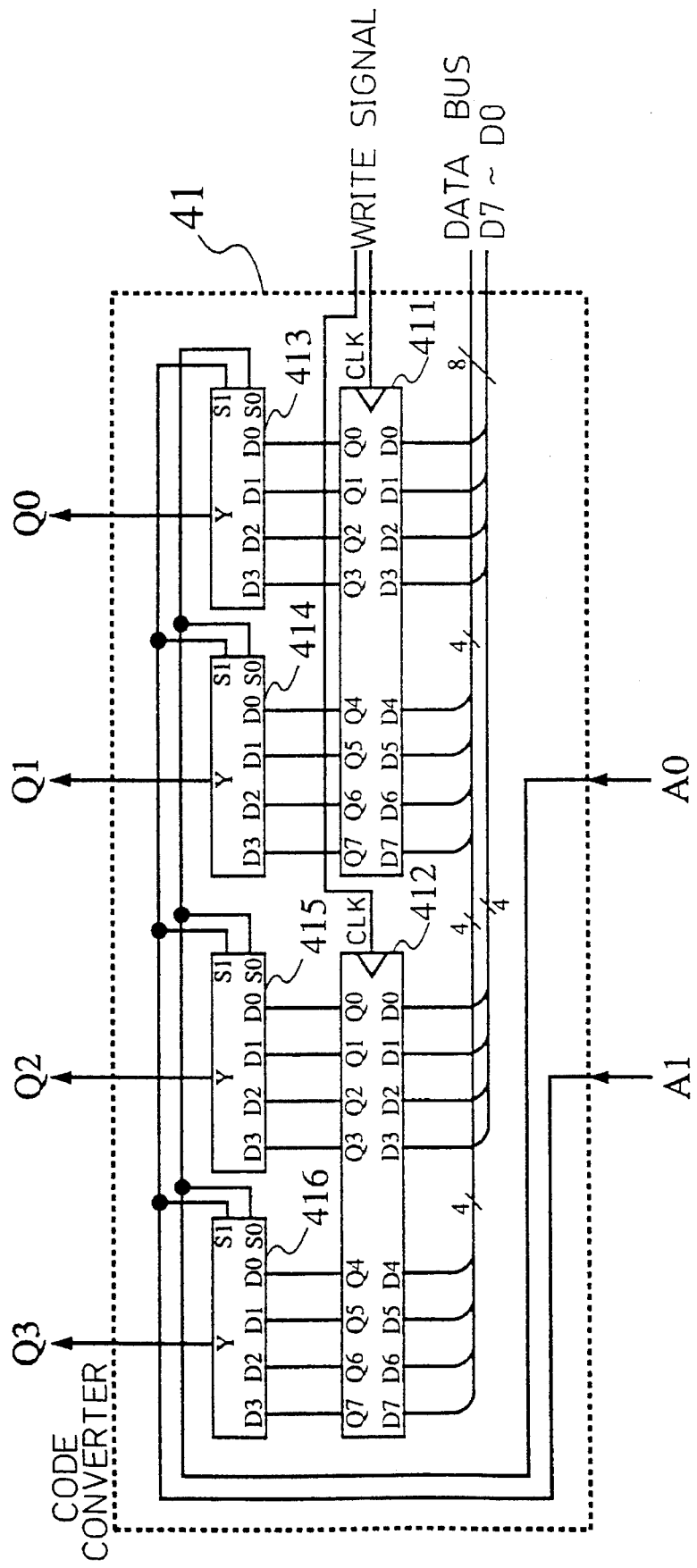
FIG. 13 is a diagram showing an example of the configuration of a code converter of FIG. 11.

Referring now to FIG. 13, an example of the configuration of the code converter 41 is described. The code converter 41 is an extended revision of the code converter 40 of FIG. 4. 411 and 412 are 8-bit D-type flip-flops known in the art. 413–416 are data selectors known in the art. By writing into the D-type flip-flops 411 and 412 data for code conversion via an 8-bit data bus formed by signal lines D7-D0, conversion rules (i.e., a conversion table) can be set with greater latitude. An example of the setting of the conversion of A1, A0 into Q3–Q0 is shown in FIG. 14. "01001010" is written into the D-type flip-flop 411. "10111111" is written into the D-type flip-flop 412.

The operation of the embodiment of FIG. 11 will now be explained. As in the third embodiment (see FIG. 9), the background and foreground live-video image data Va and Vb of FIG. 7 are input. If the outputs Q2 and Q3 of the code converter 41 are fixed at logical level "1", the data selectors 31 and 32 keep providing Vb to the input terminals B and B of the first and second mixing circuits 6 and 7, respectively. This means that the embodiment of FIG. 11 operates the same way as the embodiment of FIG. 9 in which the code converter 40 is set according to FIG. 5C. As a result, the present embodiment produces the same Vout image as shown in FIG. 7. Since the "shadow" of Vb of FIG. 7 is a shadow of the "hand/arm" casted on the "blue back", such a "shadow" inevitably comes to be dark blue. This dark blue "shadow" is translucency-mixed with Va. The "shadow" casted on the "buildings" looks unnatural.

Accordingly the outputs Q2 and Q3 of the code converter 41 change adequately according to the FIG. 14 conversion table. In this example, the Q2 output is logical level "1" in any case, and the foreground live-video image data Vb is direct-supplied to the input terminal B of the first mixing circuit 6. Keeping its original color, the "hand/arm" is translucency-composited with the background at a transparency of Tp1. Although the output Q8 is usually logical level "1", the output Q3 will be logical level "0" only when A1=1 and A0=0, thereby causing the data selector 32 to select the input data B. Then the data selector 32 starts providing the output data of the monochromizing circuit 80 to the input terminal B of the second mixing circuit 7. The second mixing circuit 7 translucency-composites the colorless "shadow" with the "building" (Va) at a transparency of Tp2. As a result, the "shadow" casted onto the "buildings" of Va is complete black and white (gray). The resulting Vout contains a shadow looking remarkably natural.

The following is a sufficient arrangement to produce the Vout of FIG. 7. The 4-bit-output code converter 41 is replaced with the 2-bit-output code converter 40 of FIG. 9, and the data selectors 31, 32 are removed, and Vb is direct-supplied to the input terminal B of the first mixing circuit 6, and the output of the monochromizing circuit 30 is direct-supplied to the input terminal B of the second mixing circuit 7.

EXAMPLE 6

Figure 15:
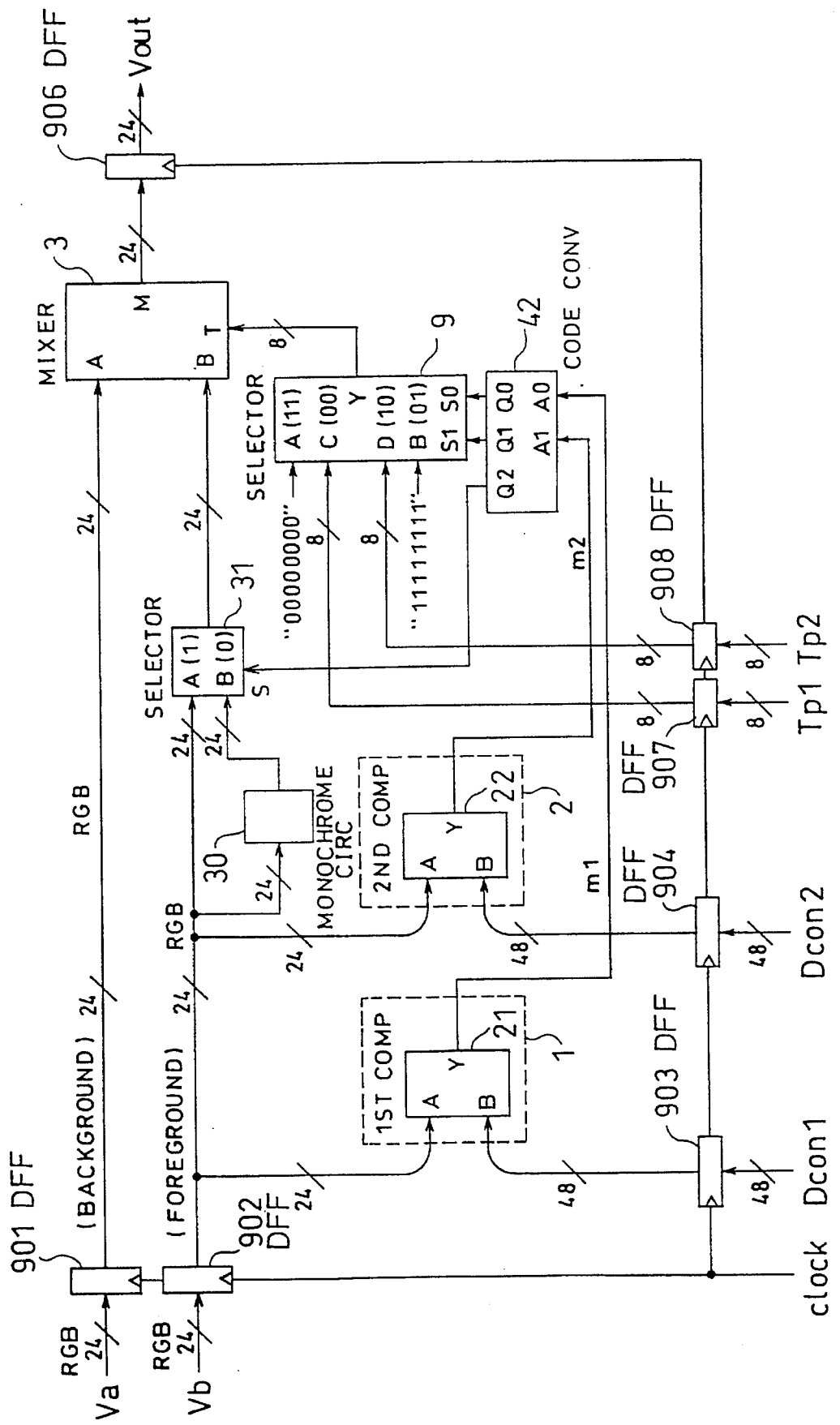
FIG. 15 is a diagram showing in block schematic form a CLCC in accordance with a sixth preferred embodiment of the present invention.

FIG. 15 is a diagram showing in block schematic form a sixth CLCC of the present invention. The sixth embodiment does not employ the code converter 40 of FIG. 10. The sixth CLCC has the following components: a monochromizing circuit 30 which is identical in configuration with the monochromizing circuit 30 of FIG. 11 (the fifth embodiment); a data selector 31 which is identical in configuration with the data selector 31 of FIG. 11; and a 3-bit-output code converter 42. Upon receipt of Vb with color information, the monochromizing circuit 30 removes the color information and provides resultant Vb carrying only the luminance (gray) components. The data selector 31 receives the monochromized Vb from the monochromizing circuit 30 and the original Vb not monochromized, selects one of these two inputs, and provides the selection to the input terminal B of the mixing circuit 3. This casts a complete monochrome (gray) "shadow" onto the background, eliminating unnatural colors (e.g., blue). As a result, more natural translucent composition effects can be realized.

Figure 16:
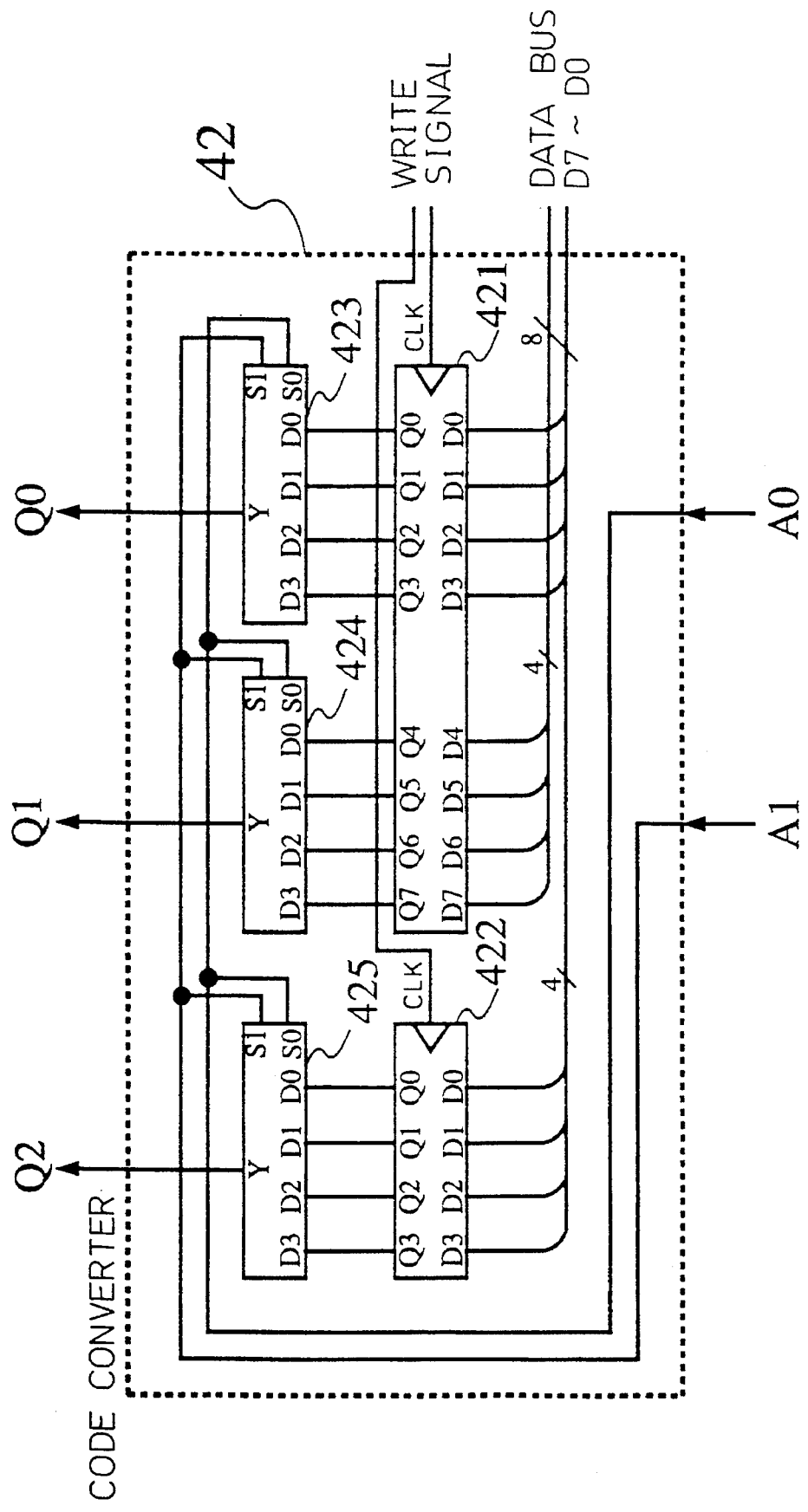
FIG. 16 is a diagram showing an example of the configuration of a code converter of FIG. 15.

Referring now to FIG. 16, an example of the configuration of the code converter 42 is described. The code converter 42 is an extended revision of the code converter 40 of FIG. 4. 421 is an 8-bit D-type flip-flop known in the art. 422 is a 4-bit D-type flip-flop known in the art. 423–425 are data selectors known in the art. By writing into the D-type flip-flops 421, 422 data for code conversion via an 8-bit data bus formed by signal lines D7-D0, conversion rules (i.e., a conversion table) can be set with greater latitude. An example of the setting of conversion of A1, A0 into Q2-Q0 is shown in FIG. 17. "01001010" is written into the D-type flip-flop 421. "1011" is written into the D-type flip-flop 422.

The operation of the embodiment of FIG. 15 will now be explained. As in the fourth embodiment (see FIG. 10), the background and foreground live-video image data Va and Vb of FIG. 7 are input. If the Q2 output of the code converter 42 of FIG. 15 is fixed at logical level "1", this causes the data selector 31 to keep providing Vb to the input terminal B of the mixing circuit 3. This means that the embodiment of FIG. 15 operates the same way as the embodiment of FIG. 10 in which the code converter 40 is set according to the setting of FIG. 5C. As a result, the present embodiment produces the same Vout image as shown in FIG. 7. Since the "shadow" of Vb of FIG. 7 is a shadow of the "hand/arm" casted on the "blue back", such a "shadow" inevitably comes to be dark blue. This dark blue "shadow" is translucency-mixed with Va. The "shadow" casted on the "buildings" looks unnatural.

Accordingly the output Q2 of the code converter 42 changes adequately according to the FIG. 17 conversion table. Although the output Q2 of the code converter 42 is usually logical level "1", the Q2 output will be logical level "0" for pixels of the "shadow" of Vb (i.e., only when A1=1 and A0=0), thereby causing the data selector 31 to select the input data B. Then the data selector 31 starts providing the output of the monochromizing circuit 30 to the input terminal B of the mixing circuit 3. The mixing circuit 3 translucency-composites the colorless "shadow" with the "buildings" (Va) at a transparency of Tp2. As a result, the "shadow" casted onto the "buildings" of Va is complete black and white (gray). The resulting Vout contains a shadow looking remarkably natural.

EXAMPLE 7

Figure 18:
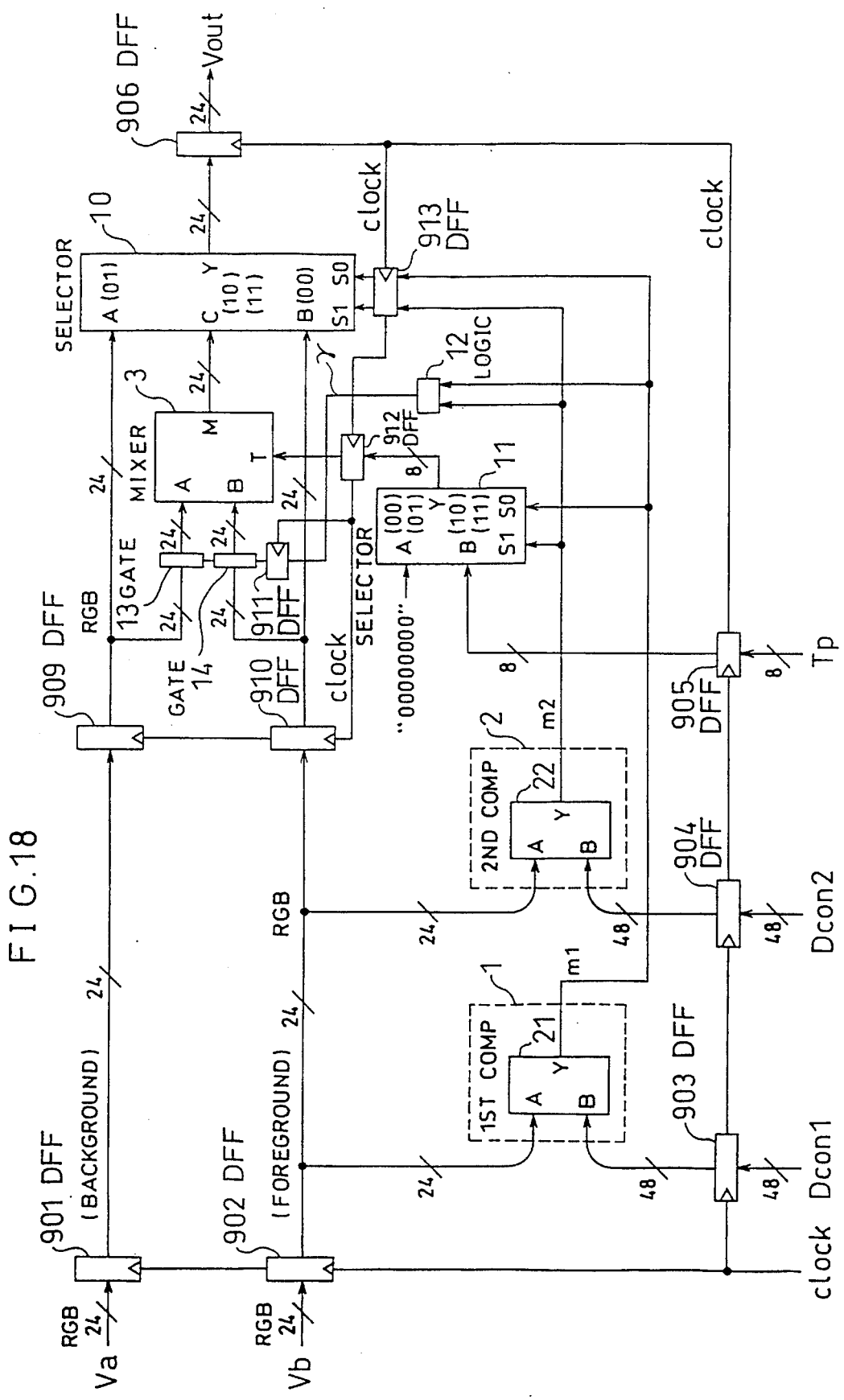
FIG. 18 is a diagram showing in block schematic form a CLCC in accordance with a seventh preferred embodiment of the present invention.

FIG. 18 is a block diagram of a seventh CLCC of the present invention. The seventh CLCC of FIG. 18 contains the first and second condition-judging circuits 1, 2, the mixing circuit 3, and the D-type flip-flops 901-906 of the First embodiment (see FIG. 1). The seventh CLCC further includes five D-type flip-flops 909-913 to provide a 2-stage-pipelined configuration. In the seventh CLCC, all the inputs of the mixing circuit 3 are deliberately fixed when no translucent composition effects are required, to cut down the power consumption.

A first data selector 11 of FIG. 18, having two input terminals A and B and an output terminal Y, receives input data A at the input terminal A and input data B at the input terminal B and determines which of these two inputs to be provided as its output Y at the output terminal Y according to the selection control input signals S1 and S0. More specifically, if S1=0 and S0=0 or if S1=0 and S0=1, then the input signal A is selected and appears as the output Y at the output terminal Y. In cases other than the above, the input signal B is selected and appears as the output Y at the output terminal Y. Applied at the input terminal A of the first data selector 11 is fixed-transparency data (e.g., "00000000") that can be set arbitrarily. On the other hand, the transparency data Tp in synchronism with the CLK is applied to the input terminal B of the first data selector 11. The output Y of the first data selector 11 is provided to the mixing circuit 3 via the D-type flip-flop 912.

A second data selector 10 of FIG. 18, having three input terminals A, B, C and an output terminal Y, receives signals A, B, and C at the respective input terminals and determines which of these three input signals to be provided as its output Y at the output terminal Y according to S1 and S0. If S1=0 and S0=1, then the input signal A is selected and appears as the output Y at the output terminal Y. If S1=0 and S0=0, then the input signal B is selected and appears as the output Y at the output terminal Y. In cases other than the above, the input signal C is selected and appears as the output Y at the output terminal Y. Applied at the input terminal A of the second data selector 10 via the D-type flip-flops 901, 909 is the background live-video image data Va. Applied at the input terminal B of the second data selector 10 via the D-type flip-flops 902, 910 is the foreground live-video image data Vb. Direct-applied at the input terminal C of the second data selector 10 is the output of the mixing circuit 3.

A logical circuit 12 is a circuit to decode the coincidence signals m2 and m1 from the second and first condition-judging circuits 2 and 1. This logical circuit 12 sends out a fixation signal 7 of logical level "0", when the translucent composition of Vb with Va is not required (i.e., when Va or Vb should be output as it was input, to Vout). In FIG. 18, the fixation signal 7 is set at logical level "0", only when m2=0 and m1=0 or m2=0 and m1=1.

Figure 19:
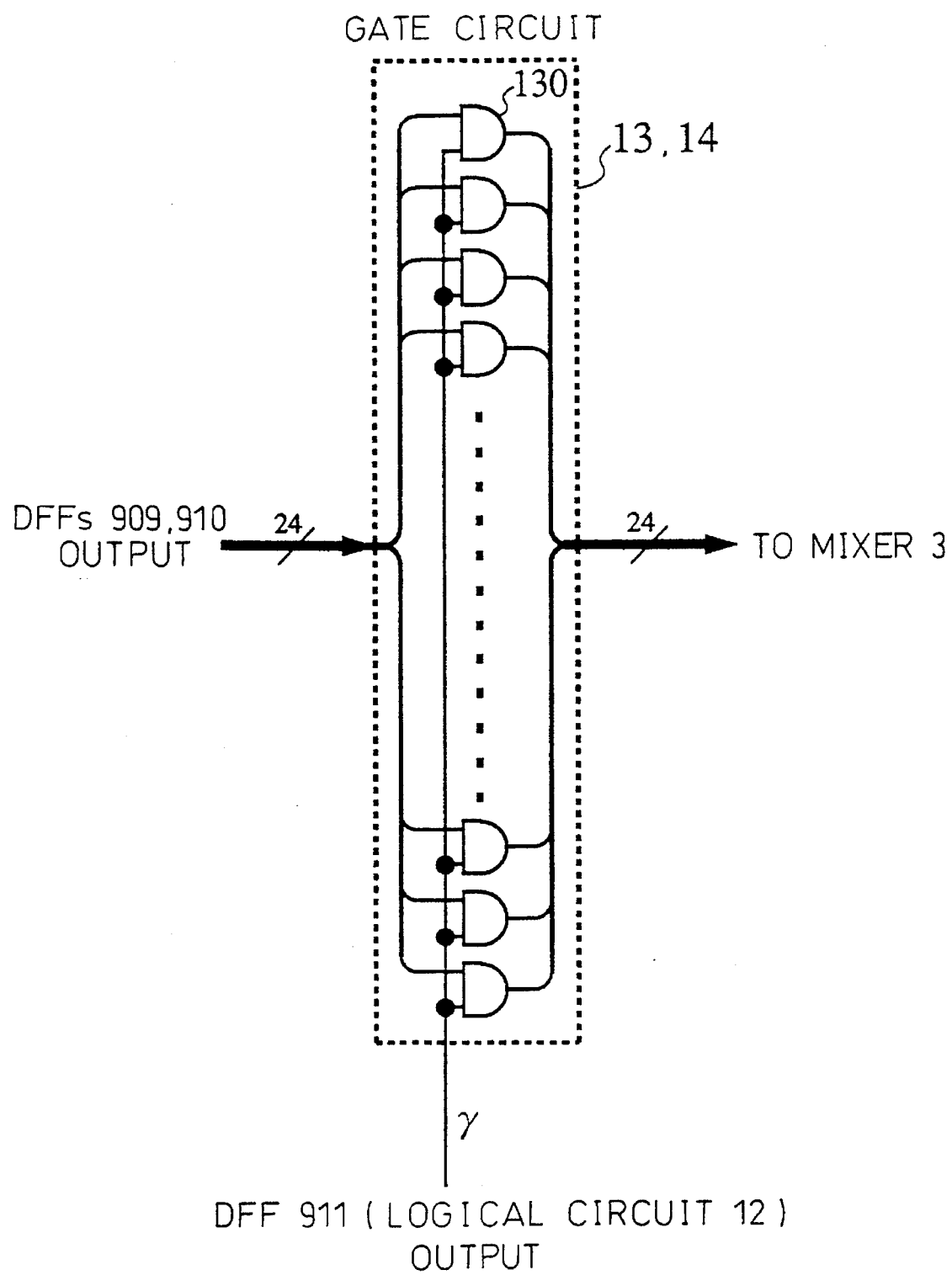
FIG. 19 is a diagram showing an example of the configuration of gates of FIG. 18.

13 and 14 are gates. Each gate 13, 14 receives 24-bit pixel data and just lets the received pixel data pass therethrough. However, only when the fixation signal γ of logical level "0" is asserted by the logical circuit 12, each gate 13, 14 outputs a fixed value of 24 bits. FIG. 19 shows an example of the configuration of the gates 13, 14. 130 is an AND gate known in the art. In FIG. 19, 24 AND gates 130 are arranged. If γ=1, each gate 13, 14 just lets received signals pass therethrough. If γ=0 (i.e., when the fixation signal γ is asserted by the logical circuit 12), a signal of 24 bits (e.g., "000000000000000000000000") is output.

The operation of the embodiment of FIG. 18 will now be described. The output data Vout is the same as produced in the first embodiment in which the code converter 40 is set according to FIG. 5A. The same output Vout as the one of FIG. 6 is obtained.

For the sake of simplicity, the description will be made, without particularly referring to the D-type flip-flops 909-913. As seen from FIG. 18, the mixing circuit 3 has thereon three input terminals A, B, and T. These input terminals A, B, and T will be fed respective fixed-values, when the translucent composition of Vb with Va is not required (i.e., pixels other than the "shadow" of Vout of FIG. 6). In other words, if pixels requiring no translucent composition are continuously input to the mixing circuit 3, the logic of the mixing circuit 3 is frozen, thereby saving electric power. If CMOS transistors are used to form the present CLCC, this reduces the power consumption to almost nil. Since the output of the mixing circuit 3 is frozen, this results in freezing much of the logic associated with the input terminal C of the second data selector 10, to further reduce the power consumption. The mixing circuit 3 of the first embodiment, formed by a great amount of hardware, keeps operating even when pixels requiring no translucent composition are continuously input. Therefore, in comparison with the first embodiment, the present embodiment much contributes to the reduction of the power consumption.

Next, the pipeline operation of the present embodiment will be explained below. FIG. 18 illustrates a 2-stage-pipelined configuration. Application of a first clock pulse causes the D-type flip-flops 901-905 to input respective data, which operates the first and second condition-judging circuits 1, 2. Application of a second clock pulse causes the D-type flip-flops 909-913 to convey results of the condition judging operations, to the mixing circuit 3 as well as to the second data selector 10 for arithmetic operations. Application of a third clock pulse causes the D-type flip-flop 906 to synchronization-provide Vout to outside the CLCC. The condition-judging stage makes the decision of whether or not the mixing circuit 3 should operate while preparing the fixation signal γ to freeze the operation of the mixing circuit 3 and waiting for a subsequent clock pulse to come. Because of the arrival of the clock pulse, the fixation signal γ reaches the mixing circuit 3. If there is a "freeze" one clock pulse earlier, the logic of the mixing circuit 3 stays totally unchanged at all, consuming no electric power.

Figure 20:
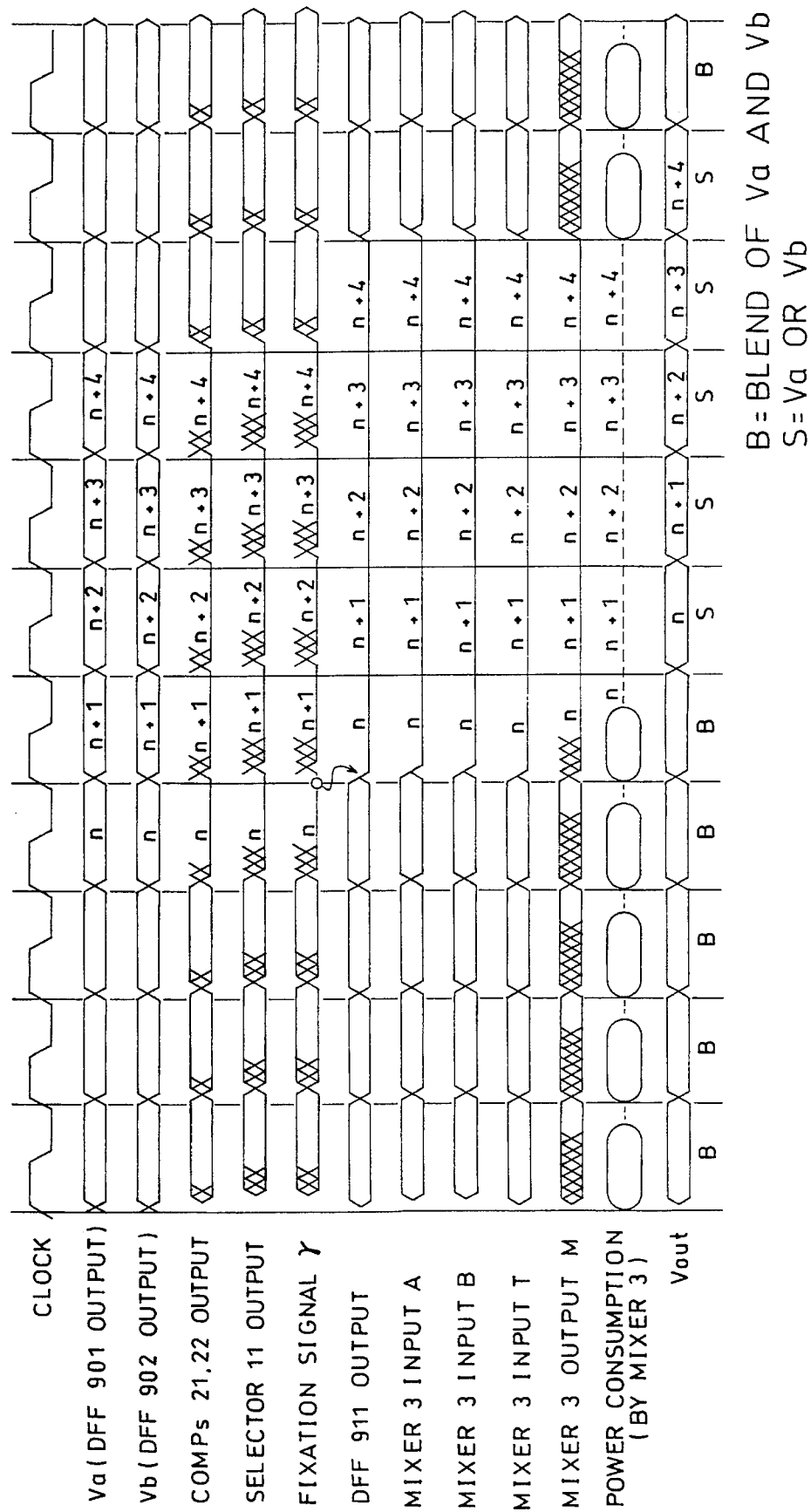
FIG. 20 is a time chart showing the operation of FIG. 18 CLCC.

FIG. 20 is a time chart of the CLCC of FIG. 18. The nth to (n+4)th pixel data of Vb are pixels requiring no translucent composition. Vout is output two clock pulses later after Va and Vb have been input. The outputs A, B, and T of the mixing circuit 3 each continue to be held at "0" for five clock pulses, and no power is consumed by the mixing circuit 3 for four clock pulses. When N pixels requiring no translucent composition are continuously input to the CLCC, the mixing circuit 3 consumes no power for (N−1) clock pulses. Generally, there hardly occurs such a situation that the entire screen is occupied by only the pixels requiring translucent composition, so that the reduction of the power consumption accomplished by the present embodiment is very attractive.

The selection rules of the data selectors 10, 11 and the decode rules of the logical circuit 12 may be set freely according to an application program used. In cases where it is not necessary to frequently change the transparency data Tp, the data selector 11 may be removed from the CLCC and the transparency data Tp is direct-supplied to the D-type flip-flop 912. Further, as in the fifth embodiment (see FIG. 11), a monochromizing circuit and a data selector may be connected between the D-type flip-flop 910 and the gate 14.

EXAMPLE 8

FIG. 21 shows in block schematic form an eighth CLCC of the present invention. This eighth CLCC is a revision of the seventh CLCC, being revised to receive the first and second transparency data Tp1 and Tp2. In the eighth CLCC, the FIG. 18 first data selector 11 with two input terminals is replaced with a first data selector 16 with three input terminals.

The first data selector 16, having three input terminals A, B, and C and an output terminal Y, receives input signals A, B, and C at the respective input terminals and determines which of these three input signals to be provided as its output Y at the output terminal Y according to S1 and S0. More specifically, if S1=0 and S0=1 or if S1=1 and S0=1, then the input signal A is selected and appears as the output Y at the output terminal Y. If S=0 and S0=0, then the input signal B is selected and appears as the output Y at the output terminal Y. If S1=1 and S0=0, then the input signal C is selected and appears as the output Y at the output terminal Y. Applied at the input terminal A of the first data selector 16 is fixed-transparency data (e.g., "00000000") that can be set arbitrarily. The first transparency data Tp1 in synchronism with the CLK is applied to the input terminal B of the first data selector 16. The second transparency data Tp2 in synchronism with the CLK is applied to the input terminal C of the first data selector 16. The output Y of the first data selector 16 is provided to the mixing circuit 3 via the D-type flip-flop 912.

A second data selector 17 of FIG. 21, having three input terminals A, B, C and an output terminal Y, receives three input signals A, B, and C at the respective input terminals and determines which of these three input signals to be output as its output Y at the output terminal Y according to S1 and S0. If S1=0 and S0=1, then the input signal A is selected and appears as the output Y at the output terminal Y. If S1=1 and S0=1, then the input signal B is selected and appears as the output Y at the output terminal Y. In cases other than the above, the input signal C is selected and appears as the output Y at the output terminal Y. Applied at the input terminal A of the second data selector 17 is the background live-video image data Va. Applied at the input terminal B of the second data selector 17 is the foreground live-video image data Vb. Applied at the input terminal C of the second data selector 17 is the output of the mixing circuit 3.

A logical circuit 15 is a circuit to decode the coincidence signals m2 and m1 from the second and first condition-judging circuits 2 and 1. This logical circuit 15 sends out a fixation signal 7 of logical level "0", when the translucent composition of Vb with Va is not required (i.e., when Va or Vb should be output as it was input, to Vout). In FIG. 21, the fixation signal γ is set at logical level "0", only when m2=0 and m1=1 or m2=1 and m1=1.

Next, the operation of the embodiment of FIG. 21 will be described. As in the third embodiment (see FIG. 9), Va and Vb (the pixel data), Dcon1 and Dcon2 (the condition data), and Tp1 and Tp2 (the transparency data) are fed to the CLCC. The result of the translucent composition performed by the first mixing circuit 3 on the "hand/arm" according to Tp1, and the result of the translucent composition performed by the mixing circuit 3 on the "shadow" according to Tp2 are reflected in Vout. In other words, Vout is produced, with the "hand/arm" and the "shadow" displayed having different degrees of transparency as shown in FIG. 7.

As in the seventh embodiment (see FIG. 18), 2-stage pipelining is executed in the present embodiment. Additionally, when no translucent compositing processing is required, all of the inputs A, B, and T of the mixing circuit 3 are fixed, whereupon the power consumption by the mixing circuit 3 is reduced to almost nil.

Further, the selection rules of the data selectors 16, 17 and the decode rules of the logical circuit 15 may be set freely to an application program used. Furthermore, following the fifth embodiment (see FIG. 11), a monochromizing circuit and a data selector may be connected between the D-type flip-flop 910 and the gate 14.

The invention claimed is:

1. A chroma-key live-video compositing circuit for combining a foreground live-video image with a background live-video image to produce a mixed live-video image in real time comprising:

a first means for receiving pixel data of said background live-video image and pixel data of said foreground live-video image in synchronism with a clock signal;

a second means for generating a first binary signal indicative of whether or not said pixel data of said foreground live-video image meets a first condition;

a third means for generating a second binary signal indicative of whether or not said pixel data of said foreground live-video image meets a second condition;

a fourth means for selectively providing either said pixel data of said background live-video image, said pixel data of said foreground live-video image, or pixel data that is obtained by multiplying each of said pixel data of said background live-video image and said pixel data of said foreground live-video image by a respective weight and summing each product of said multiplication, in order to produce a totally transparent composition effect, an opaque composition effect, and a translucent composition effect according to a code made up of said first and said second binary signal; and a fifth means for providing said selectively-provided pixel data from said fourth means as pixel data of said mixed live-video image in synchronism with said clock signal.

2. The chroma-key live-video compositing circuit of claim 1 further including a means for receiving from outside said chroma-key live-video compositing circuit first condition data describing said first condition and second condition data describing said second condition, said each condition data designating a key color of said pixel data of said foreground live-video image.

3. The chroma-key live-video compositing circuit of claim 1 further including a means for receiving from outside said chroma-key live-video compositing circuit transparency data designating weight allocation between said pixel data of said background live-video image and said pixel data of said foreground live-video image.

4. The chroma-key live-video compositing circuit of claim 1 further including a means which is connected between said second and said third means, and said fourth means and which converts said code according to programmable rules.

5. The chroma-key live-video compositing circuit of claim 1 wherein:

said fourth means includes:

a mixing means for multiplying each of said pixel data of said background live-video image and said pixel data of said foreground live-video image by the respective weight assigned according to given transparency data and summing each product of said multiplication, and providing resultant pixel data; and a selecting means for selectively providing to said fifth means either said pixel data of said background live-video image, said pixel data of said foreground live-video image, or said resultant pixel data from said mixing means, in order to produce the totally transparent composition effect, the opaque composition effect, and the translucent composition effect according to said code.

6. The chroma-key live-video compositing circuit of claim 5 wherein:

said mixing means includes:

a monochromizing circuit for removing color information contained in said pixel data of said foreground live-video image and providing resultant monochrome pixel data;

a data selector for selectively providing either said pixel data of said foreground live-video image or said monochrome pixel data according to said code; and a mixing circuit for multiplying each of said pixel data of said background live-video image and said selectively-provided pixel data from said data selector by the respective weight assigned according to said given transparency data and summing each product of said multiplication, and providing resultant pixel data to said selecting means.

7. The chroma-key live-video compositing circuit to claim 5 wherein:

said mixing means includes:

a first mixing circuit for multiplying each of said pixel data of said background live-video image and said pixel data of said foreground live-video image by the respective weight assigned according to first given transparency data and summing each product of said multiplication, and providing resultant pixel data to said selecting means;

a monochromizing circuit for removing color information contained in said pixel data of said foreground live-video image and providing resultant monochrome pixel data; and a second mixing circuit for multiplying each of said pixel data of said background live-video image and said monochrome pixel data from said monochromizing circuit by the respective weight assigned according to second given transparency data and summing a result of the multiplication of said pixel data of said background live-video image and said monochrome pixel data, and providing resultant pixel data to said selecting means.

8. The chroma-key live-video compositing circuit of claim 5 further including a means for stopping said mixing means' operation, when said selecting means selects either said pixel data of said background live-video image or said pixel data of said foreground live-video image.

9. The chroma-key live-video compositing circuit of claim 1, wherein said fourth means comprises:

a mixing means for multiplying each of said pixel data of said background live-video image and said pixel data of said foreground live-video image by the respective weight and summing each product of said multiplication to provide resultant pixel data to said fifth means; and a selecting means for controlling said mixing means to produce either said pixel data of said background live-video image, said pixel data of said foreground live-video image, or pixel data of said resultant pixel data by selectively providing to said mixing means either first fixed transparency data designating the totally transparent composition effect, second fixed transparency data designating the opaque composition effect, or transparency data designation the translucent composition effect, according to said code;

wherein said respective weight used by said mixing means is determined according to said selectively-provided transparency data from said selecting means.

10. The chroma-key live-video compositing circuit of claim 9 wherein:

said mixing means includes:

a monochromizing circuit for removing color information contained in said pixel data of said foreground live-video image and providing resultant monochrome pixel data;

a data selector for selectively providing either said pixel data of said foreground live-video image or said monochrome pixel data from said monochromizing circuit according to said code; and a mixing circuit for multiplying each of said pixel data of said background live-video image and said selectively-provided pixel data from said data selector by the respective weight assigned according to said selectively-provided transparency data from said selecting means and summing each product of said multiplication, and providing said resultant pixel data to said fifth means.

11. A chroma-key live-video compositing circuit employing a pipelined architecture for combining a foreground live-video image with a background live-video image to produce a mixed live-video image in real time comprising:

a first D-type flip-flop for holding and providing pixel data of said background live-video image in synchronism with a clock signal;

a second D-type flip-flop for holding and providing pixel data of said foreground live-video image in synchronism with said clock signal;

a third D-type flip-flop for holding and providing said pixel data of said background live-video image from said first D-type flip-flop in synchronism with said clock signal;

a fourth D-type flip-flop for holding and providing said pixel data of said foreground live-video image from said second D-type flip-flop in synchronism with said clock signal;

a first comparator for generating a first binary signal indicative of whether or not said pixel data of said foreground live-video image from said second D-type flip-flop meets conditions described by first condition data;

a second comparator for generating a second binary signal indicative of whether or not said pixel data of said foreground live-video image from said second D-type flip-flop meets conditions described by second condition data;

a logical circuit for providing either an asserted fixation signal in the case of a pixel not requiring a translucent composition effect or a deactivated fixation signal in the case of a pixel requiring the translucent composition effect according to a code made up of said first and said second binary signal;

a fifth D-type flip-flop for holding and providing given transparency data in synchronism with said clock signal;

a sixth D-type flip-flop for holding and providing said fixation signal from said logical circuit in synchronism with said clock signal;

a seventh D-type flip-flop for holding and providing said code in synchronism with said clock signal;

a first gate for providing either said pixel data of said background live-video image as provided from said third D-type flip-flop if said sixth D-type flip-flop provides said deactivated fixation signal or substitute fixed pixel data if said sixth D-type flip-flop provides said asserted fixation signal;

a second gate for providing either said pixel data of said foreground live-video image as provided form said fourth D-type flip-flop if said sixth D-type flip-flop provides said deactivated fixation signal or substitute fixed pixel data if said sixth D-type flip-flop provides said asserted fixation signal;

a mixing circuit for multiplying each of said pixel data from said first gate and said pixel data from said second gate of the respective weight assigned according to said given transparency data from said fifth D-type flip-flop and summing each product of said multiplication, and providing resultant pixel data;

a data selector for selectively providing either said pixel data of said background live-video image from said third D-type flip-flop, said pixel data of said foreground live-video image from said fourth D-type flip-flop, or said pixel data from said mixing circuit, in order to produce a totally transparent composition effect, an opaque composition effect, and the translucent composition effect according to said code from said seventh D-type flip-flop; and an eighth D-type flip-flop for holding said selectively-provided pixel data from said data selector and providing same as pixel data of said mixed live-video image in synchronism with said clock signal;

wherein:

said data selector selects between said pixel data of said background live-video image from said third D-type flip-flop and said pixel data of said foreground live-video image from said fourth D-type flip-flop if said code made up of said first and second binary signals causes said logical circuit to send out said asserted fixation signal; and said data selector selects said pixel data from said mixing circuit if said code made up of said first and second binary signals causes said logical circuit to send out said deactivated fixation signal.

12. The chroma-key live-video compositing circuit of claim 11 further including:

a selector;

said selector providing, to said fifth D-type flip-flop, either at least one item of variable transparency data supplied in synchronism with said clock signal if said code made up of said first and second binary signals causes said logical circuit to send out said deactivated fixation signal or substitute fixed transparency data if said code made up of said first and second binary signals causes said logical circuit to send out said asserted fixation signal.

* * * * *

UNITED STATES PATENT AND TRADEMARK OFFICE
CERTIFICATE OF CORRECTION

PATENT NO. : 5,500,684
DATED : March 19, 1996
INVENTOR(S) : Uya

It is certified that error appears in the above-identified patent and that said Letters Patent is hereby corrected as shown below:

Column 7, line 66, change " "1000000" " to --"10000000"--.

Column 8, line 6, change "908" to --903--.

Column 12, line 55, change "Q8" to --Q3--; and
        line 59, change "80" to --30--

Column 14, line 56, change "7" to --γ--; and
        line 59, change "7" to --γ--;

Column 16, line 58, change "7" to --γ--.

Signed and Sealed this

Thirtieth Day of May, 2000

Attest:

Q. TODD DICKINSON

*Attesting Officer*      *Director of Patents and Trademarks*